(12) United States Patent
Safa

(10) Patent No.: US 10,601,600 B2
(45) Date of Patent: *Mar. 24, 2020

(54) METHOD AND SYSTEM FOR SHARING CONTENT FILES USING A COMPUTER SYSTEM AND DATA NETWORK

(71) Applicant: Pushfor, Ltd, London (GB)

(72) Inventor: John Safa, London (GB)

(73) Assignee: Pushfor, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,172

(22) Filed: Feb. 1, 2018

(65) Prior Publication Data

US 2018/0227137 A1   Aug. 9, 2018

Related U.S. Application Data

(63) Continuation of application No. 15/486,397, filed on Apr. 13, 2017, now Pat. No. 9,954,689, and a
(Continued)

(51) Int. Cl.
*G06F 21/62* (2013.01)
*H04L 12/18* (2006.01)
(Continued)

(52) U.S. Cl.
CPC ........ *H04L 12/1813* (2013.01); *G06F 16/116* (2019.01); *G06F 16/176* (2019.01); *G06F 21/10* (2013.01); *G06F 21/6209* (2013.01); *G06F 21/6218* (2013.01); *H04L 12/1859* (2013.01); *H04L 51/32* (2013.01); *H04L 63/0245* (2013.01); *H04L 63/101* (2013.01);
(Continued)

(58) Field of Classification Search
CPC ............ G06F 21/6272; G06F 21/6218; G06F 21/6209; G06F 21/606; G06F 21/10; G06F 21/30; G11B 20/00188; G11B 20/00604

See application file for complete search history.

(56) References Cited

U.S. PATENT DOCUMENTS 8,497,910 B2   7/2013   Tanaka et al.
8,867,779 B2   10/2014  Anbalagan et al.
(Continued)

OTHER PUBLICATIONS

Frank Olken and Doron Rotem. Random sampling from database files: A survey. In International Conference on Scientific and Statistical Database Management, pp. 92-111. Springer, 1990.
(Continued)

*Primary Examiner* — Paul E Callahan

(57) ABSTRACT

A system for distributing digital content obtained from a variety of sources in a variety of formats is described that utilizes a content distribution system configured to receive and store the content files, convert the content file both into a standardized format file and into a thumbnail file, and associate the content with one or more tags that can signify characteristics or relevant facts about the content file. Users of the system select one or more tags on their remote devices in order that the content distribution system automatically transmit to the remote device thumbnail images of those content files that match the selected tags. Users can then select the thumbnail image in order to cause the system to transmit to the remote device the standardized format version of the content.

46 Claims, 52 Drawing Sheets

Related U.S. Application Data continuation-in-part of application No. 14/973,606, filed on Dec. 17, 2015, application No. 15/486,397, which is a continuation of application No. 14/303,927, filed on Jun. 13, 2014, now Pat. No. 9,660,821.

(60) Provisional application No. 61/945,618, filed on Feb. 27, 2014, provisional application No. 61/892,831, filed on Oct. 18, 2013, provisional application No. 61/834,838, filed on Jun. 13, 2013.

(51) Int. Cl.
| | |
|---|---|
| H04L 12/58 | (2006.01) |
| H04W 4/18 | (2009.01) |
| H04L 29/06 | (2006.01) |
| H04L 29/08 | (2006.01) |
| H04W 4/21 | (2018.01) |
| G06F 16/11 | (2019.01) |
| G06F 21/10 | (2013.01) |
| G06F 16/176 | (2019.01) |

(52) U.S. Cl.
CPC .............. *H04L 67/06* (2013.01); *H04L 67/26* (2013.01); *H04W 4/18* (2013.01); *H04W 4/21* (2018.02); *G06F 2221/0724* (2013.01); *H04L 12/1822* (2013.01); *H04L 51/066* (2013.01); *H04L 63/10* (2013.01); *H04L 63/107* (2013.01); *H04L 63/108* (2013.01)

(56) References Cited

U.S. PATENT DOCUMENTS

| | | |
|---|---|---|
| 9,214,136 B1 | 12/2015 | Smailus |
| 9,660,821 B2 | 5/2017 | Safa |
| 2002/0174010 A1 | 11/2002 | Rice |
| 2003/0137525 A1 | 7/2003 | Smith |
| 2003/0212745 A1 | 11/2003 | Caughey |
| 2006/0152609 A1 | 7/2006 | Prentice et al. |
| 2008/0022003 A1 | 1/2008 | Alve |
| 2010/0036967 A1 | 2/2010 | Caine et al. |
| 2011/0067087 A1 | 3/2011 | Thornton et al. |
| 2011/0283309 A1 | 11/2011 | Bliss et al. |
| 2011/0307804 A1 | 12/2011 | Spierer |

OTHER PUBLICATIONS

Mark De Berg, Marc Van Kreveld, Mark Overmars, and Otfried Cheong Schwarzkopf. Computational geometry, pp. 95-120. Springer, 3 edition, 2000.

Avraham Margalit and Gary D Knott. An algorithm for computing the union, intersection or difference of two polygons. Computers & Graphics, 13(2):167-183, 1989.

Bernard Chazelle. Lower bounds for orthogonal range searching: I. the reporting case. Journal of the ACM (JACM), 37(2):200-212, 1990.

Radu Berinde. Efficient implementations of range trees. 2007.

Database Entity Dependencies

METHOD AND SYSTEM FOR SHARING CONTENT FILES USING A COMPUTER SYSTEM AND DATA NETWORK

This application claims priority as a continuation of U.S. patent application Ser. No. 15/486,397 filed on Apr. 13, 2017, issued as U.S. Pat. No. 9,954,689, issued Apr. 24, 2018, and as a continuation-in-part of U.S. patent application Ser. No. 14/973,606, filed on Dec. 17, 2015. The '397 application claims priority as a continuation of U.S. patent application Ser. No. 14/303,927, filed on Jun. 13, 2014, issued as U.S. Pat. No. 9,660,821, issued May 23, 2017, which claims priority to U.S. Provisional Application No. 61/945,618 filed on Feb. 27, 2014 and which also claims priority to U.S. Provisional Application No. 61/892,831 filed on Oct. 18, 2013 and to U.S. Provisional Application No. 61/834,838 filed on Jun. 13, 2013, all of which are incorporated herein by reference in their entireties for all that they teach.

FIELD OF INVENTION

This invention is a system related to uploading and sharing content files between users. For convenience, the system is referred to herein as "Pushfor." Pushfor is a platform to allow content from one user to be 'pushed' to other users via a cloud computing architecture. The system provides a flexible way for users to specify channels, so that they automatically become recipients of certain kinds of content. The system also permits users to specify recipient lists to receive particular pieces of content. Content may be controlled in order to maintain security over the content or maintain restrictions in order to be compliant with local copyright law.

DETAILED DESCRIPTION

The Pushfor system is a system for sharing content files comprised of:
A conversion subsystem configured to receive a content file and convert the content file into a standardized format file and into a thumbnail file;
An input subsystem to receive at least one tag data to be associated with the received content file;
A data storage subsystem configured to store the conversion output of the conversion subsystem and to maintain a data structure that associates the standard format of the uploaded file with the thumbnail file of the uploaded file and to further associate the stored files with the at least one tag data;
A routing subsystem configured to receive at least one channel criteria associated with a corresponding at least one recipient user and to determine whether the at least one tag data conforms with the at least one recipient user channel criteria, and in dependence thereon, transmit a data message to the at least one recipient user, the data message being comprised of the thumbnail file; and
A transmitting subsystem configured to transmit the converted file to the at least one recipient user in response to a request from the at least one recipient user to view the converted file associated with the thumbnail file.
The system is further comprised of:
A security subsystem that determines whether the at least one recipient user is permitted to access the converted file, and in dependence thereon, preventing transmission of the message.
The system is further comprised of:
At least one player subsystem that operates on at least one device corresponding to the at least one recipient user, where the player device is configured to receive the converted standard content file from the transmitting subsystem and to prevent the at least one recipient user from accessing the file upon a restriction condition occurring.

The process of Pushfor involves two types of users: Content transmitting users, who may be authors, editors or authorized persons controlling a document ("transmitting users") are users who upload content so that it can be shared with others and content recipient users ("recipient users") are users who view content transmitted to them using the Pushfor system.

Figure 27:
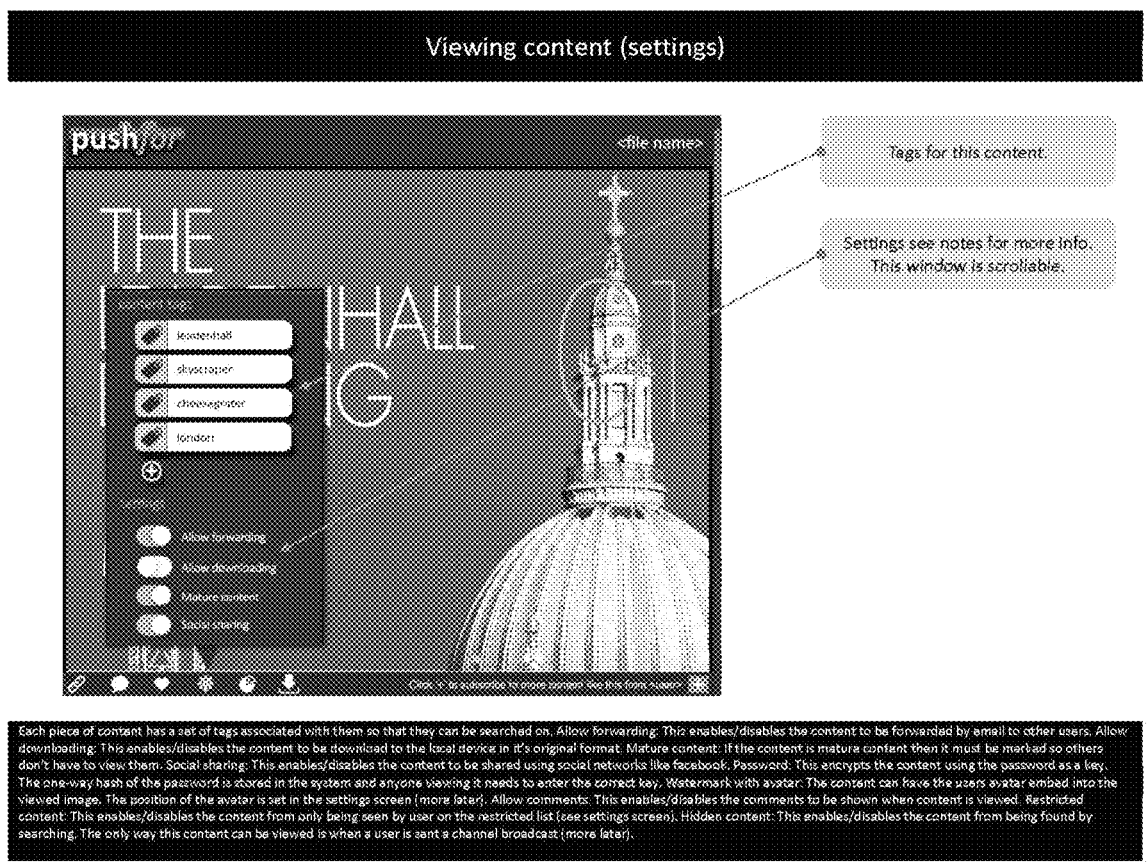
Figure 28:
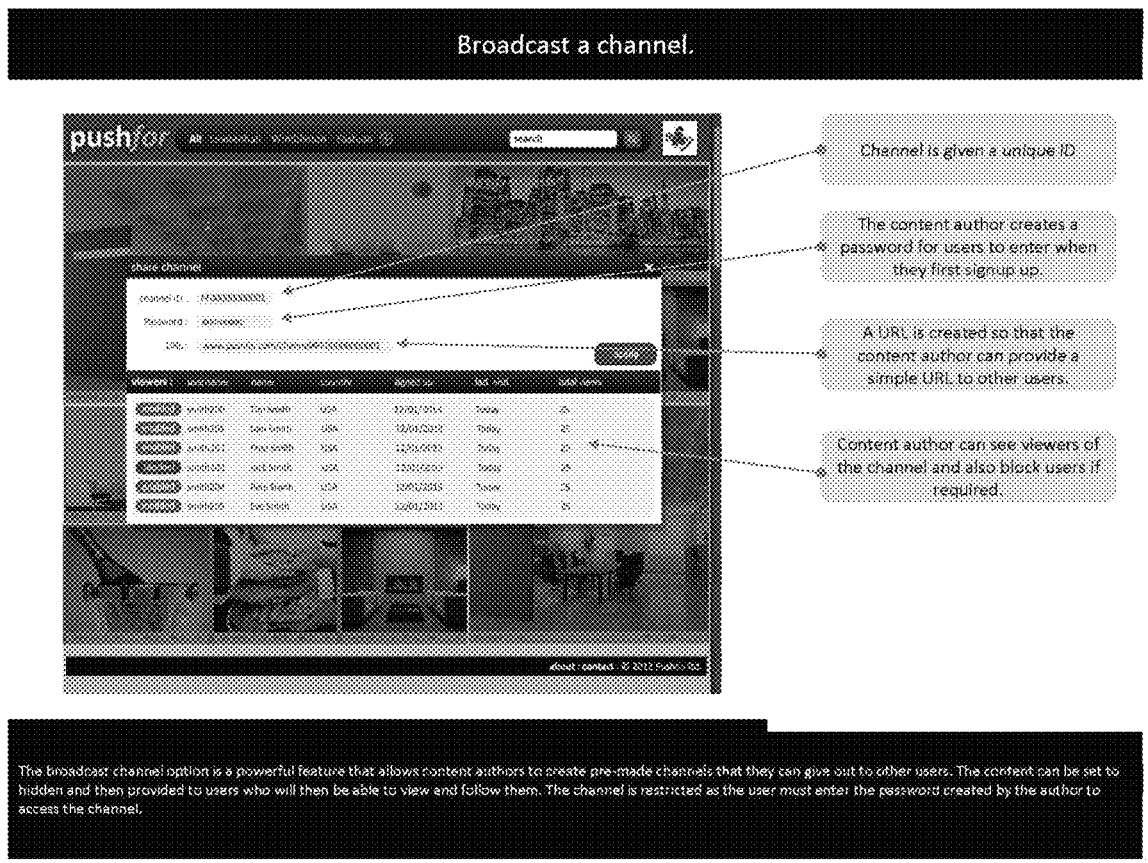
Figure 29:
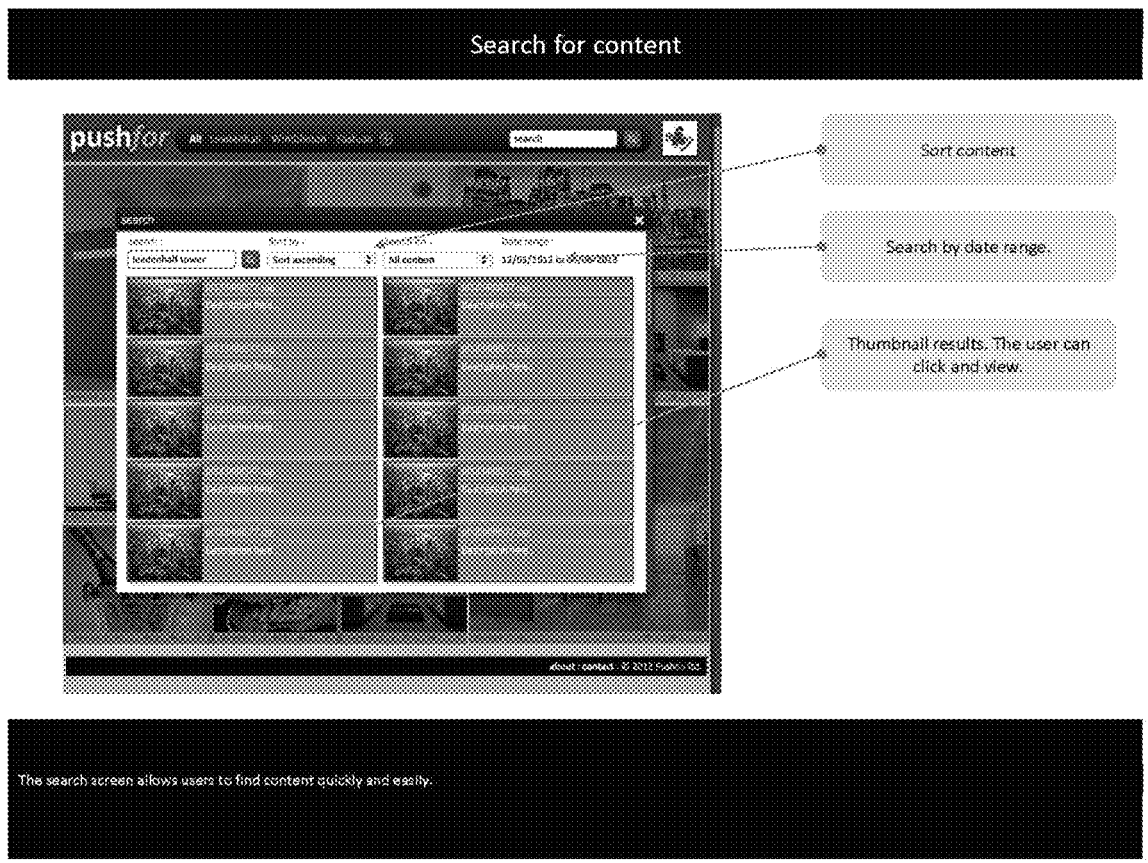
Figure 30:
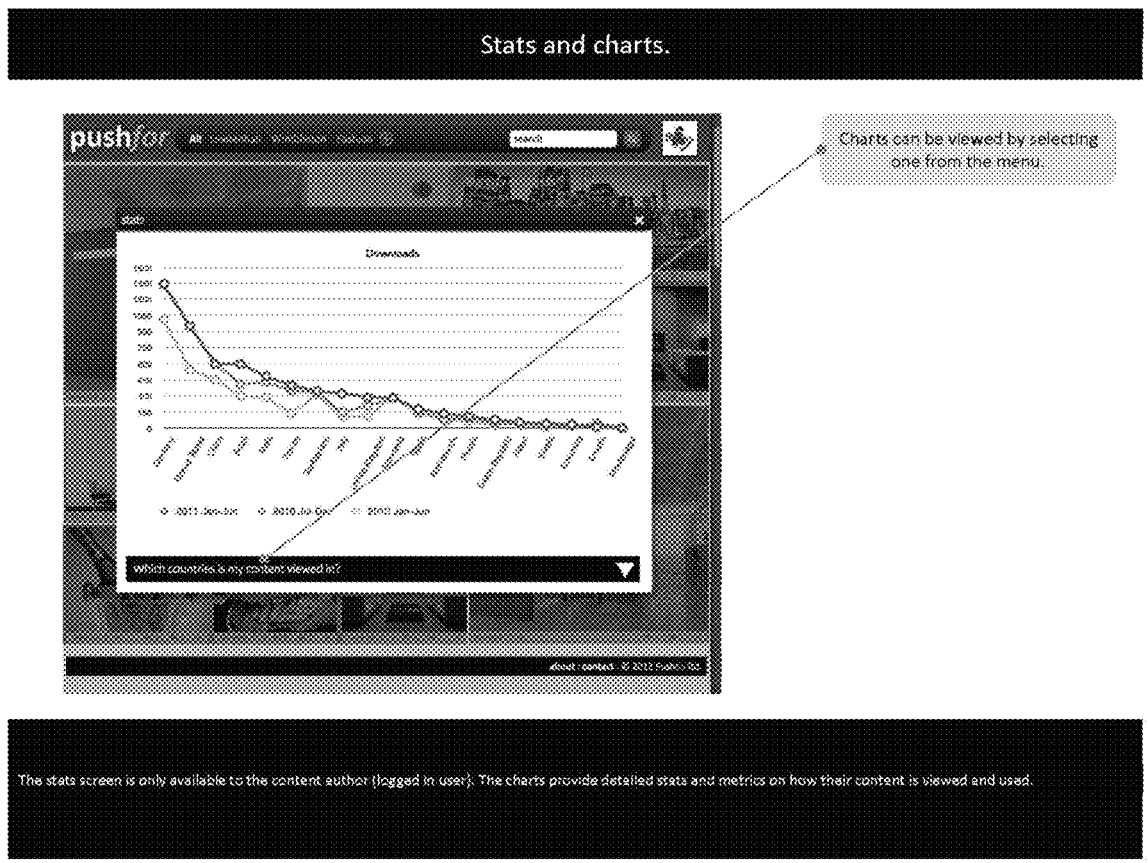
Figure 31:
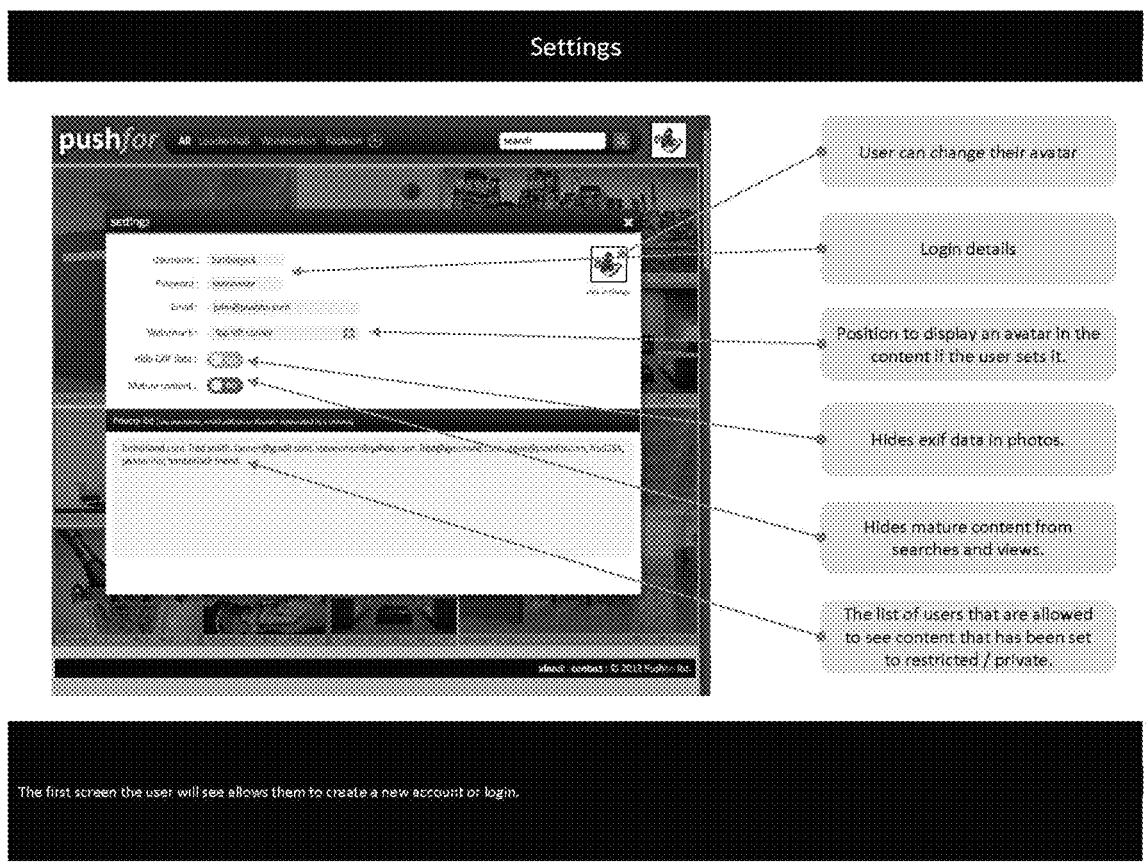
Figure 32:
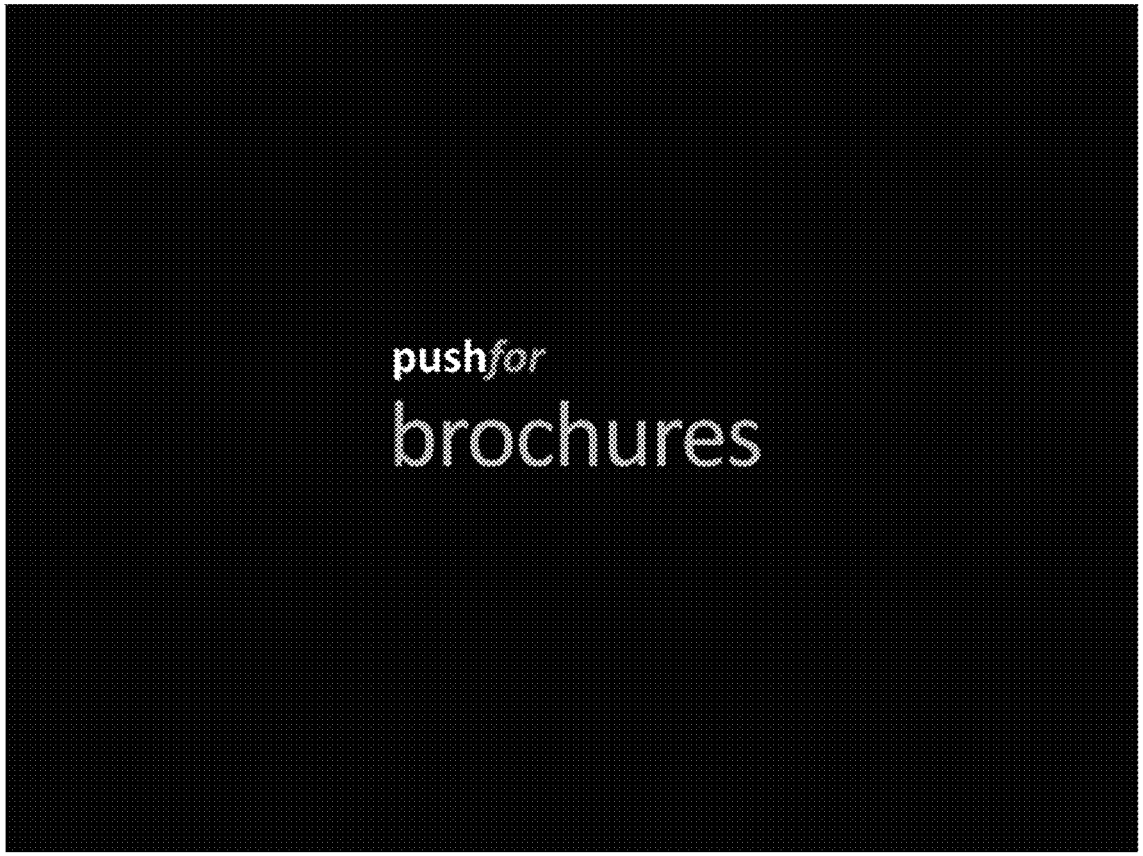
Figure 33:
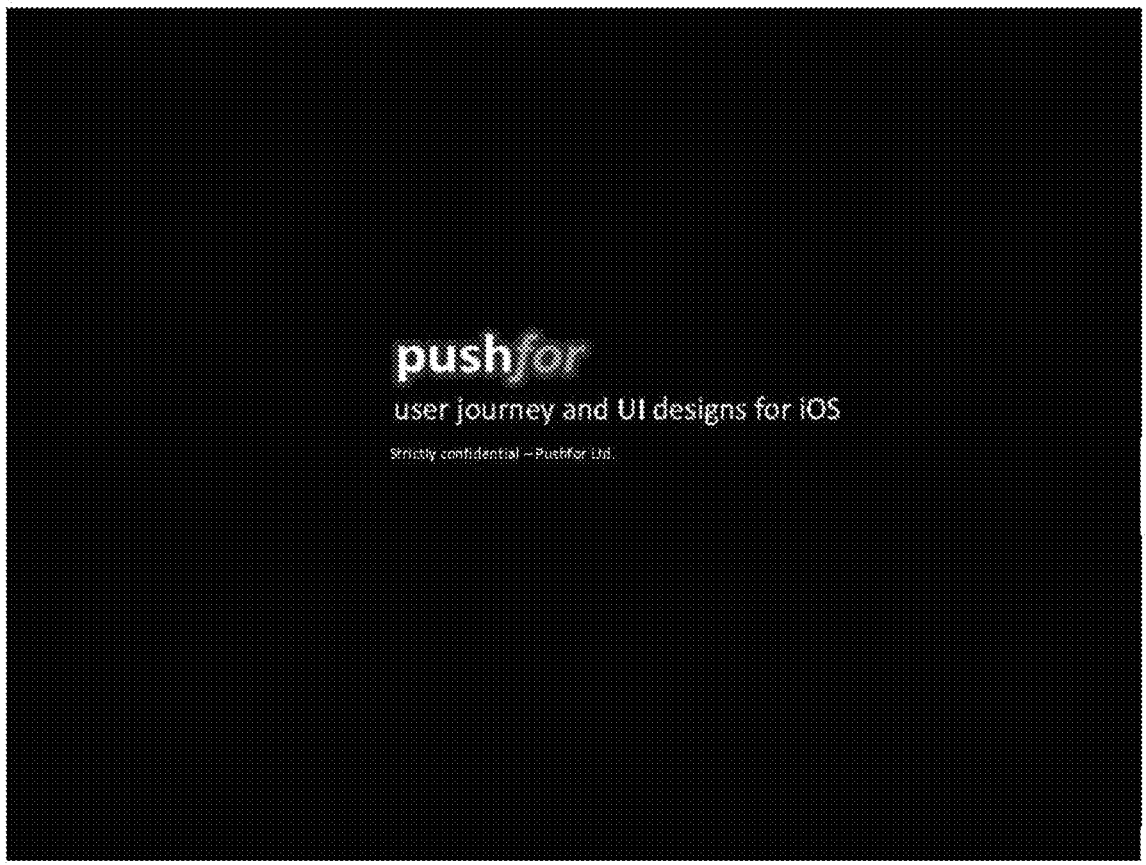
Figure 34:
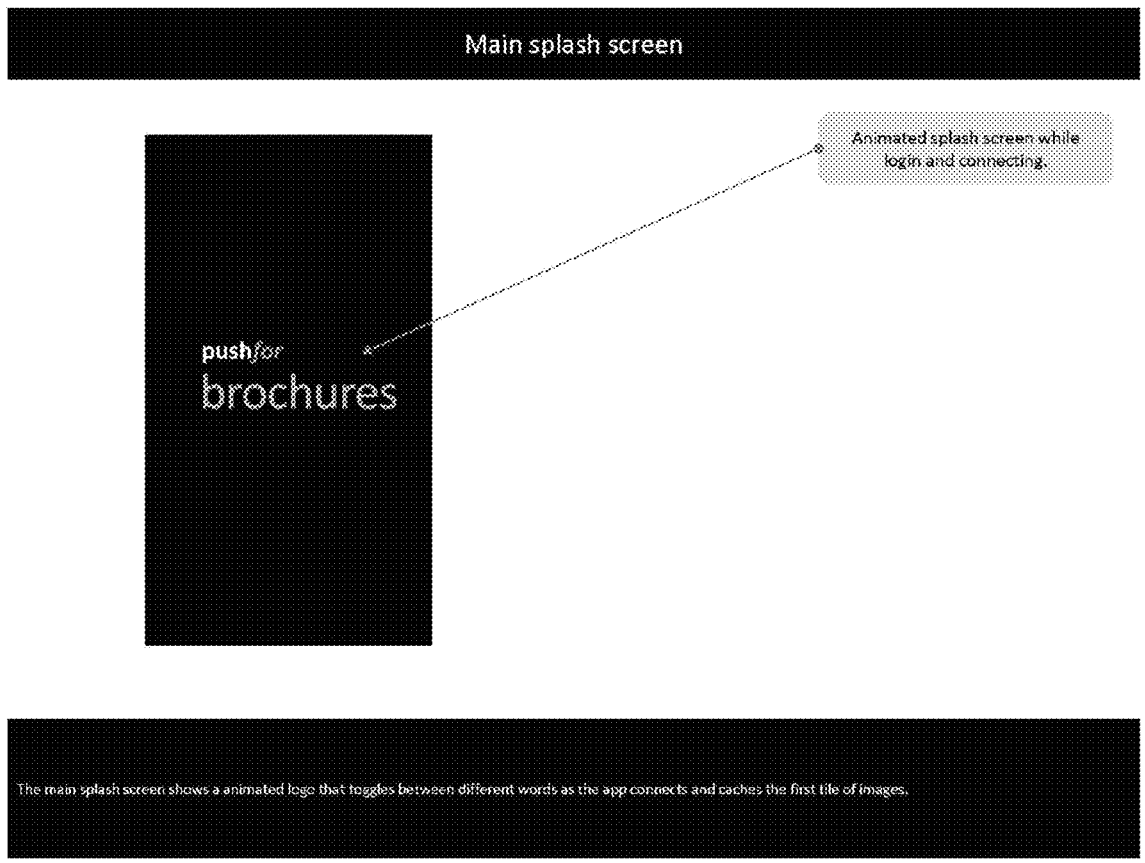
Figure 35:
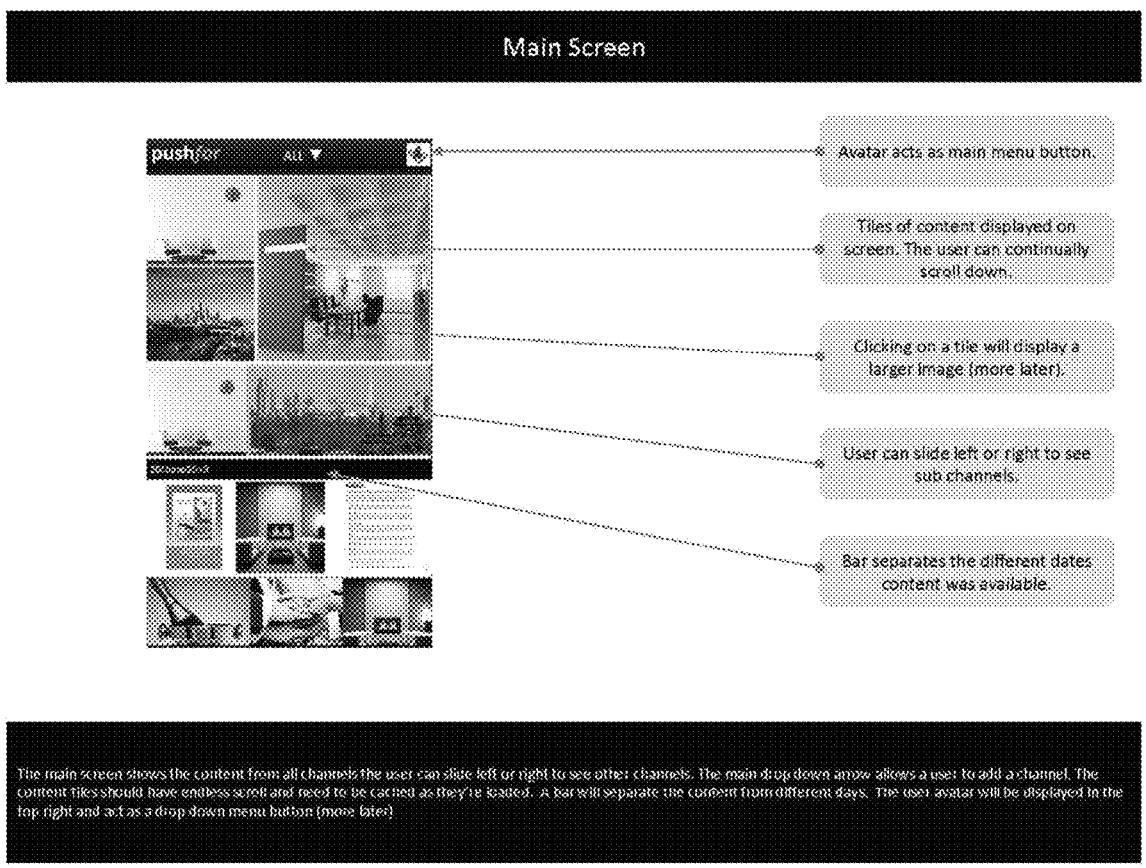
Figure 36:
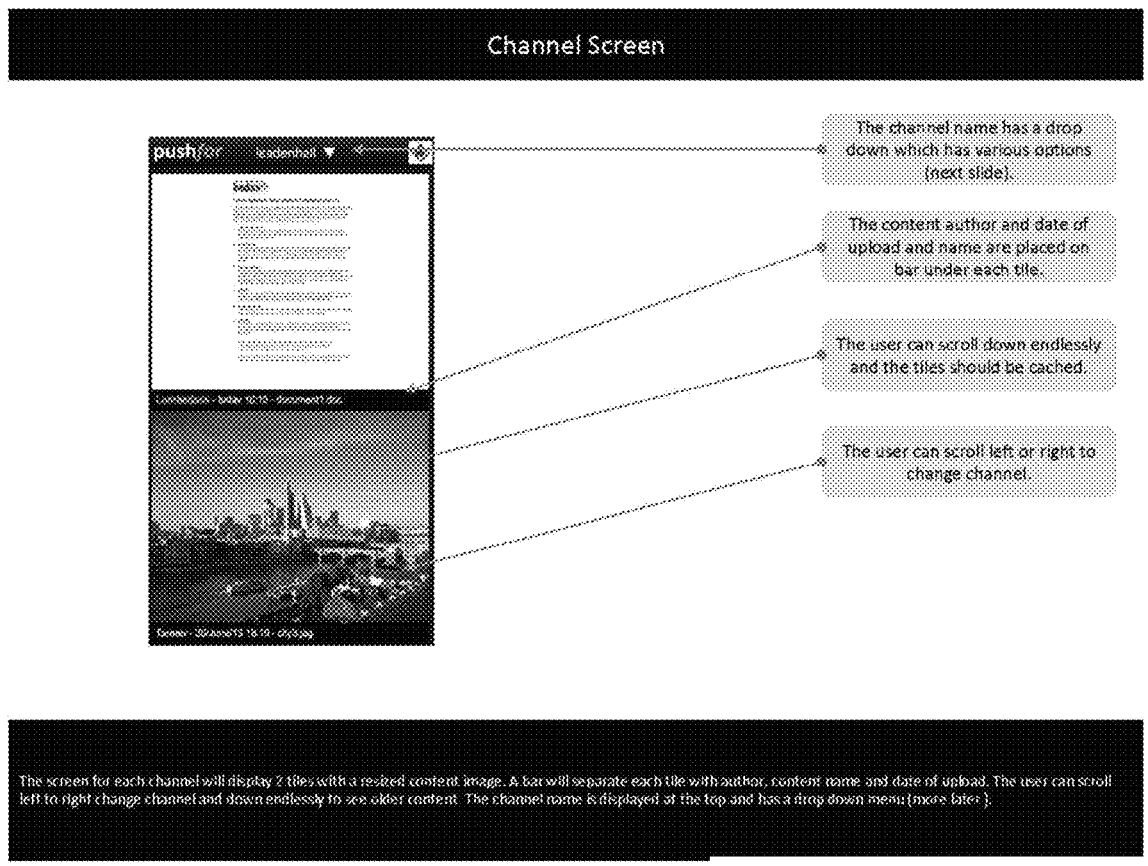
Figure 37:
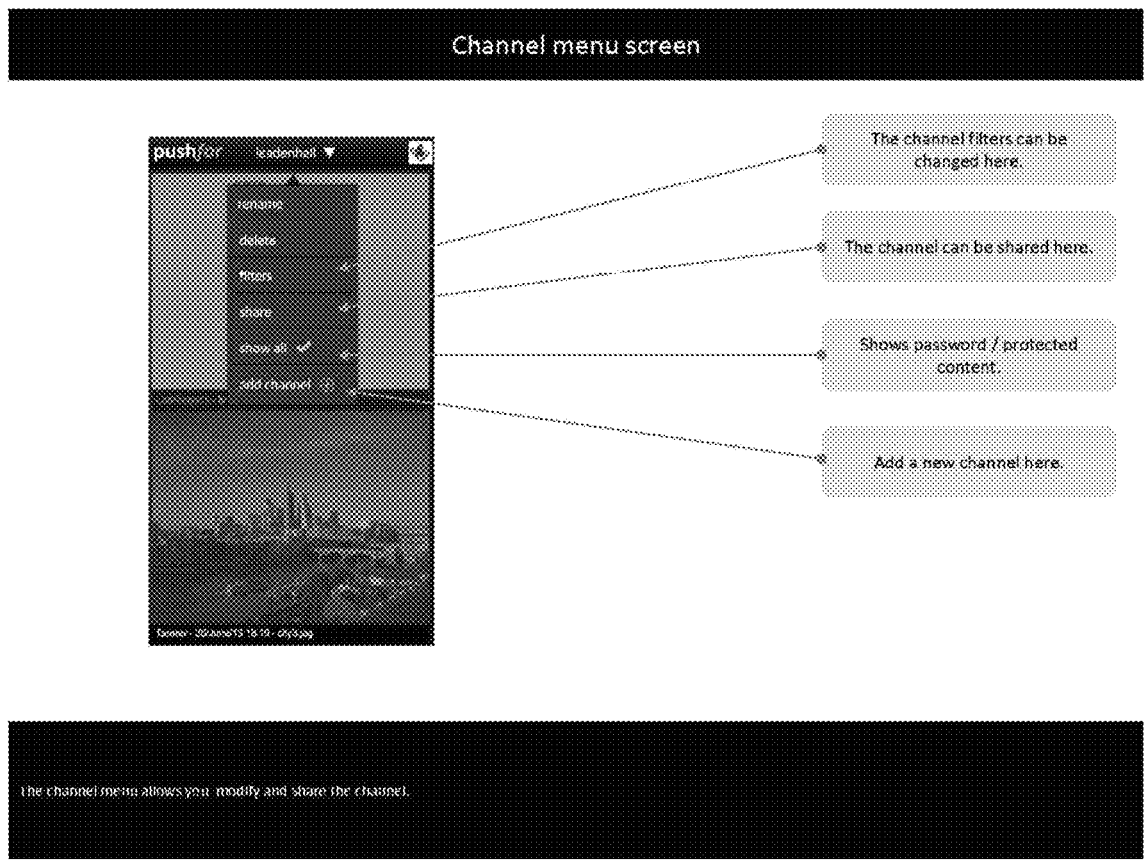
Figure 38:
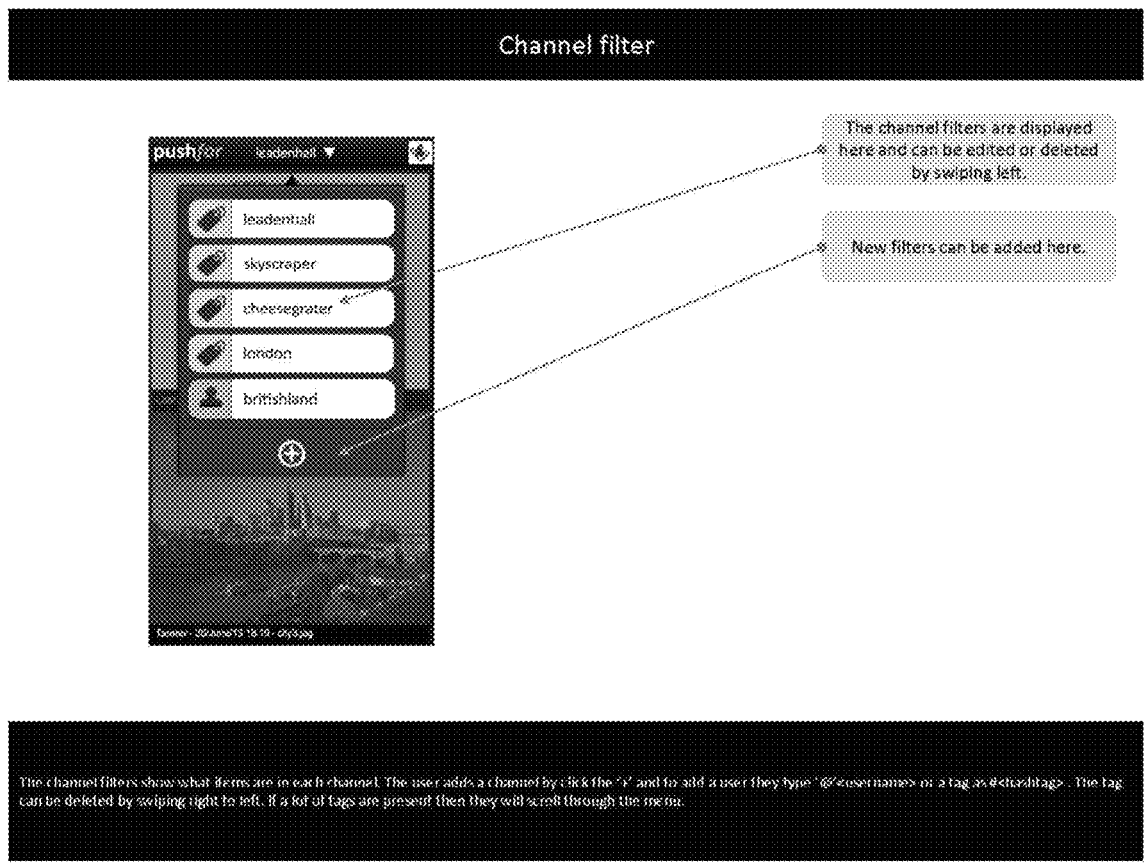
Figure 39:
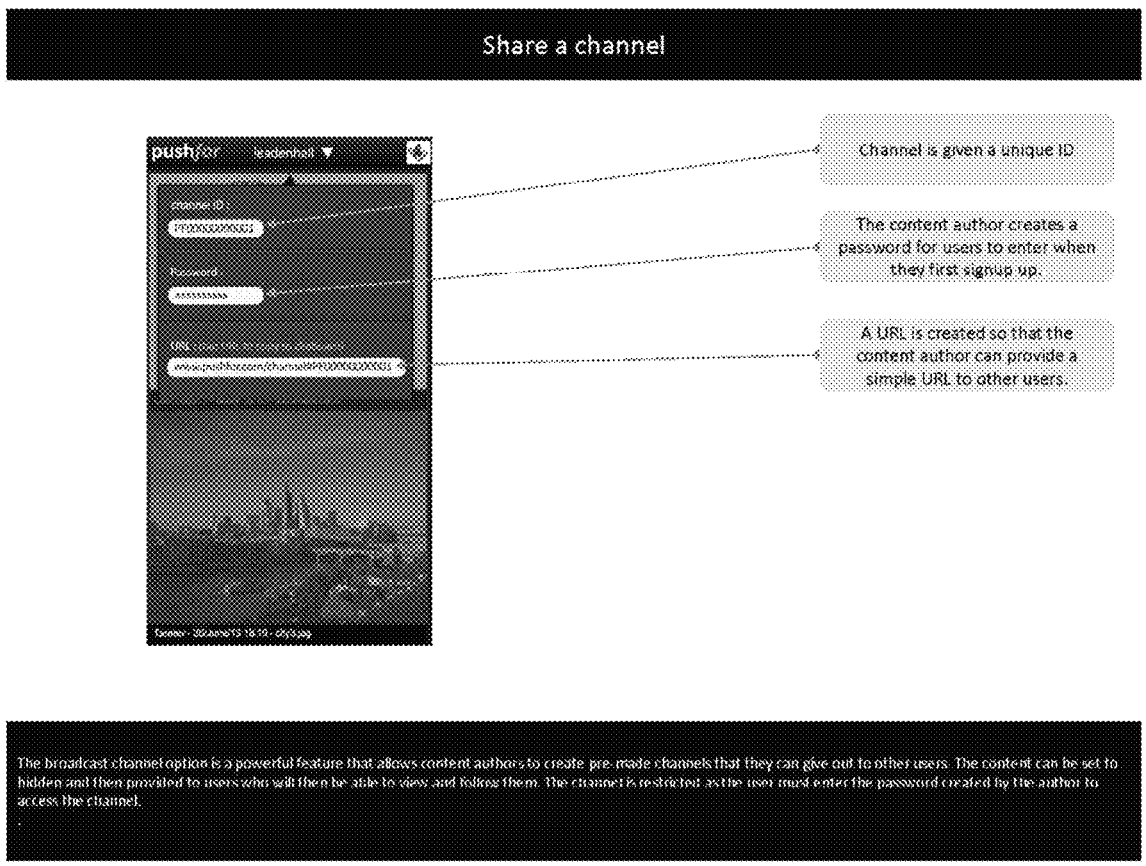
Figure 40:
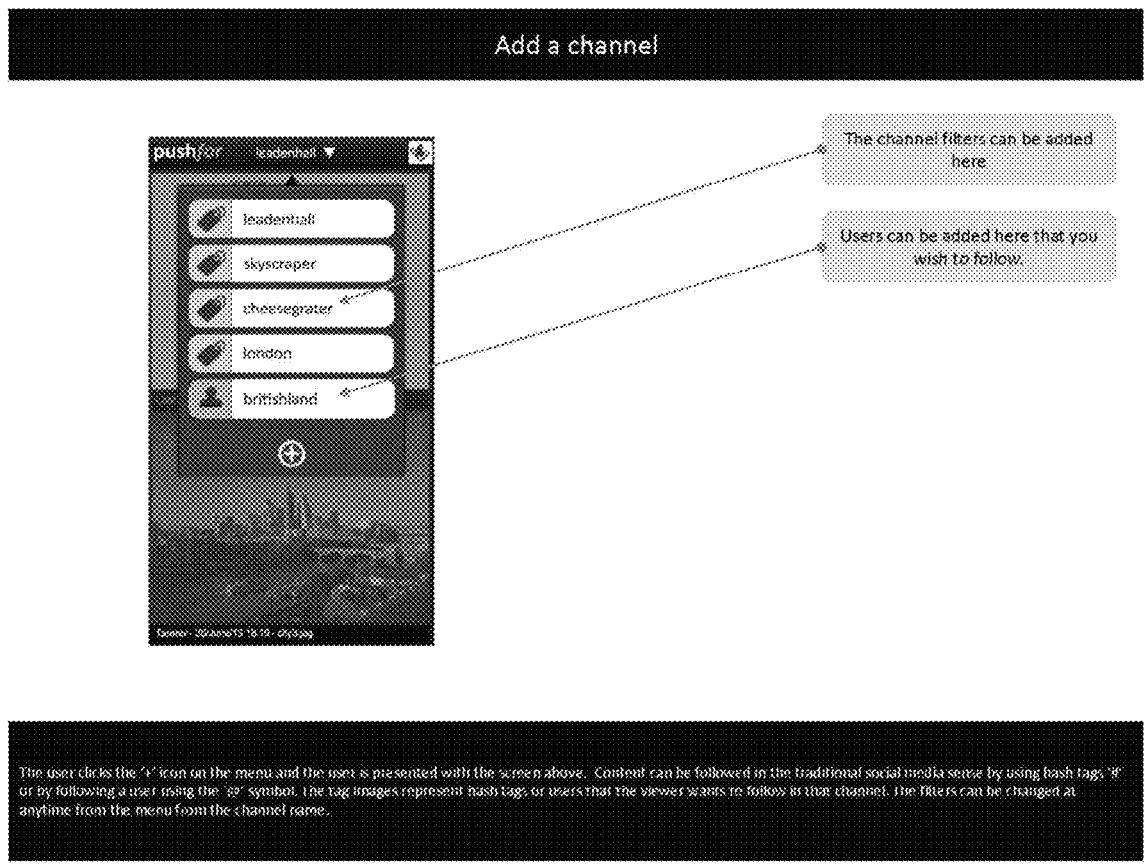
Figure 41:
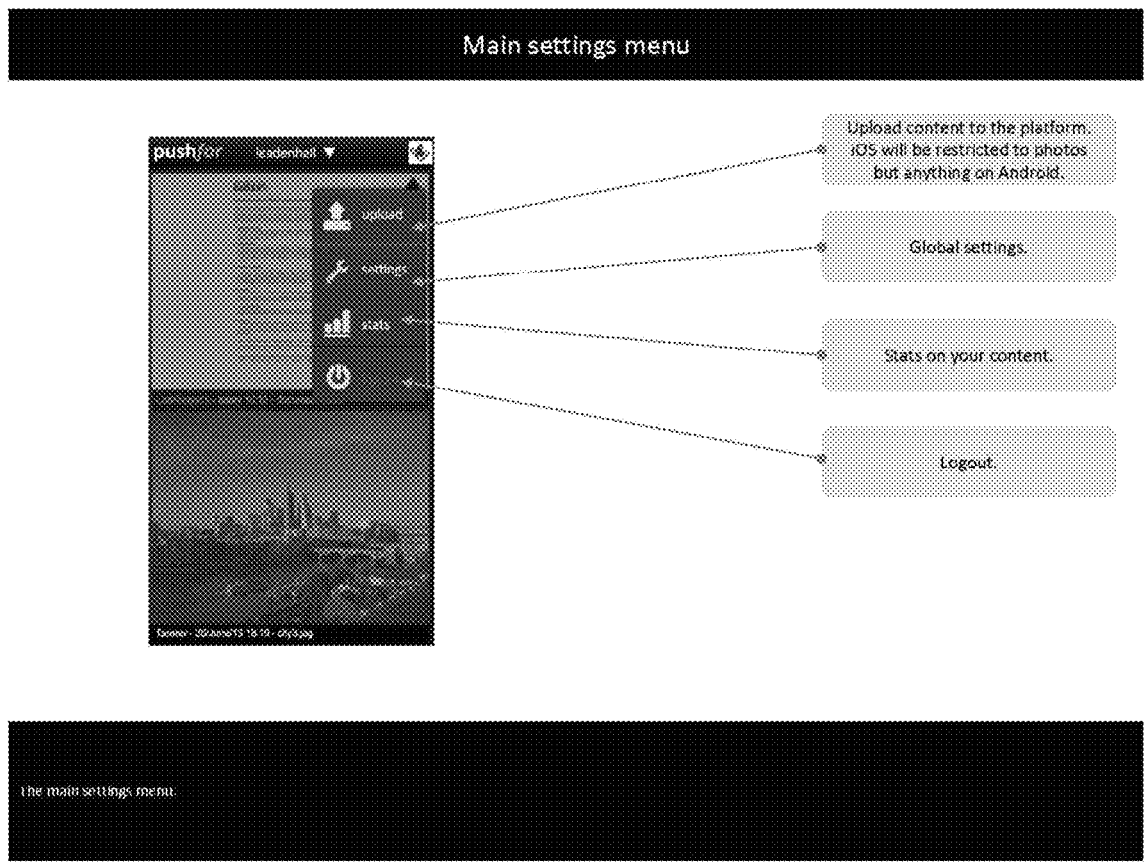
Figure 42:
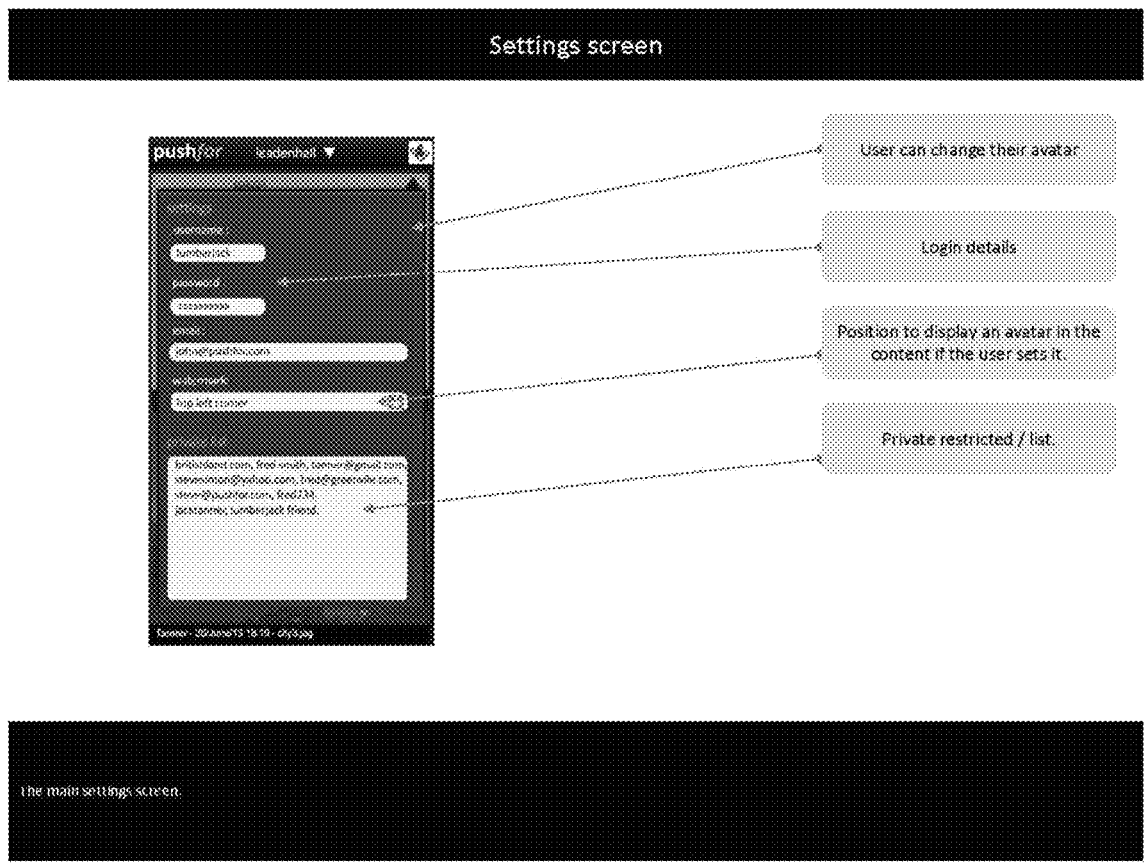
Figure 43:
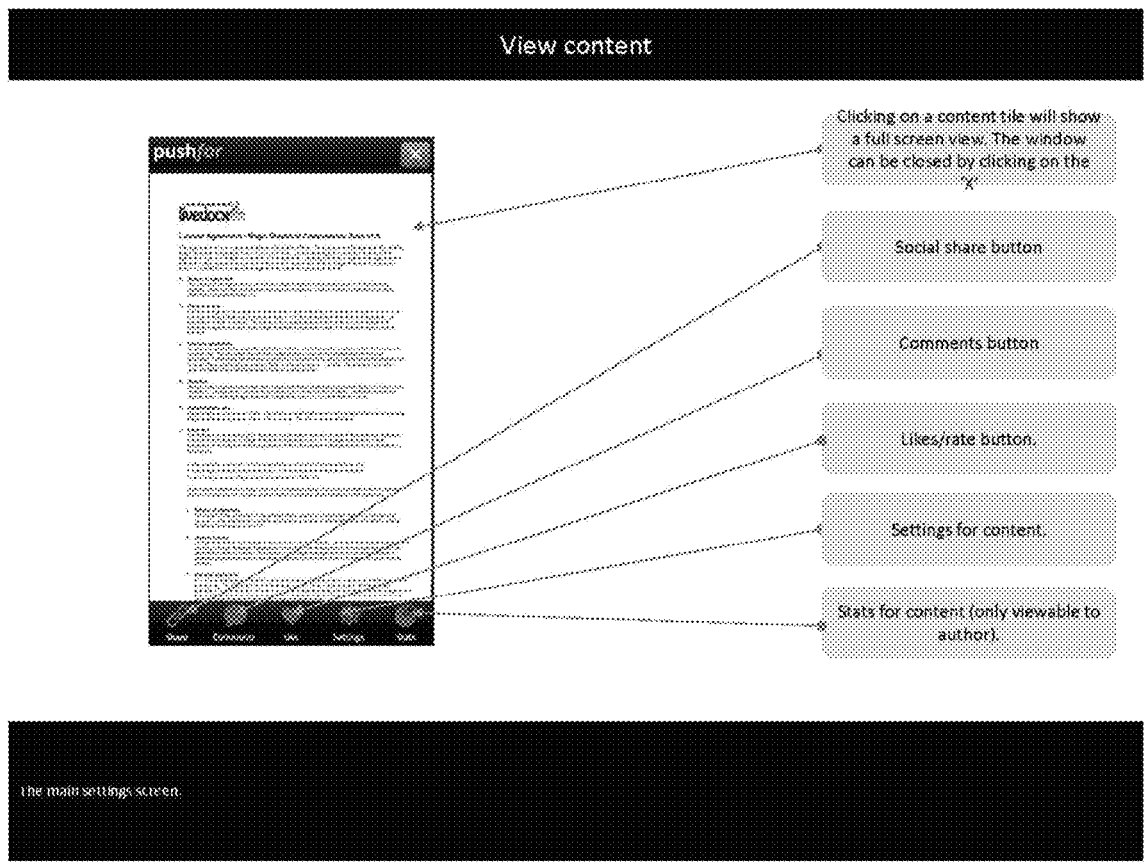
Figure 44:
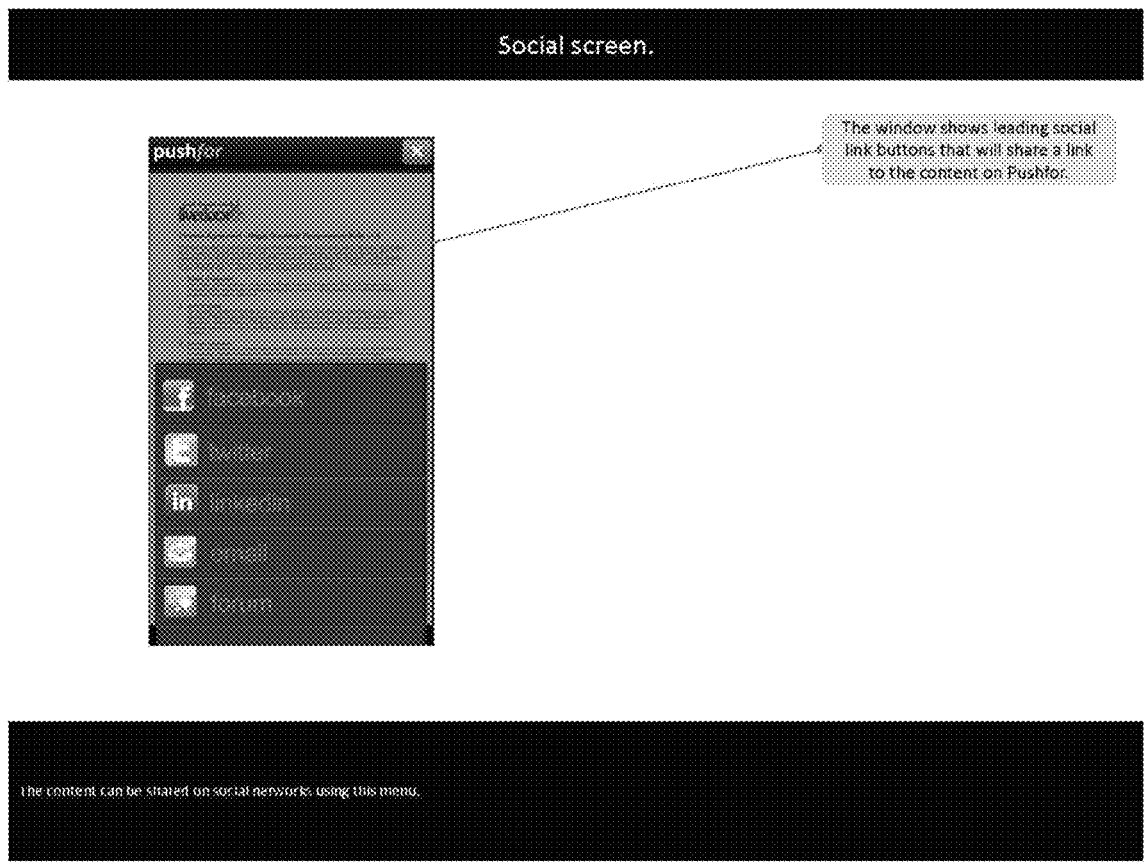
Figure 45:
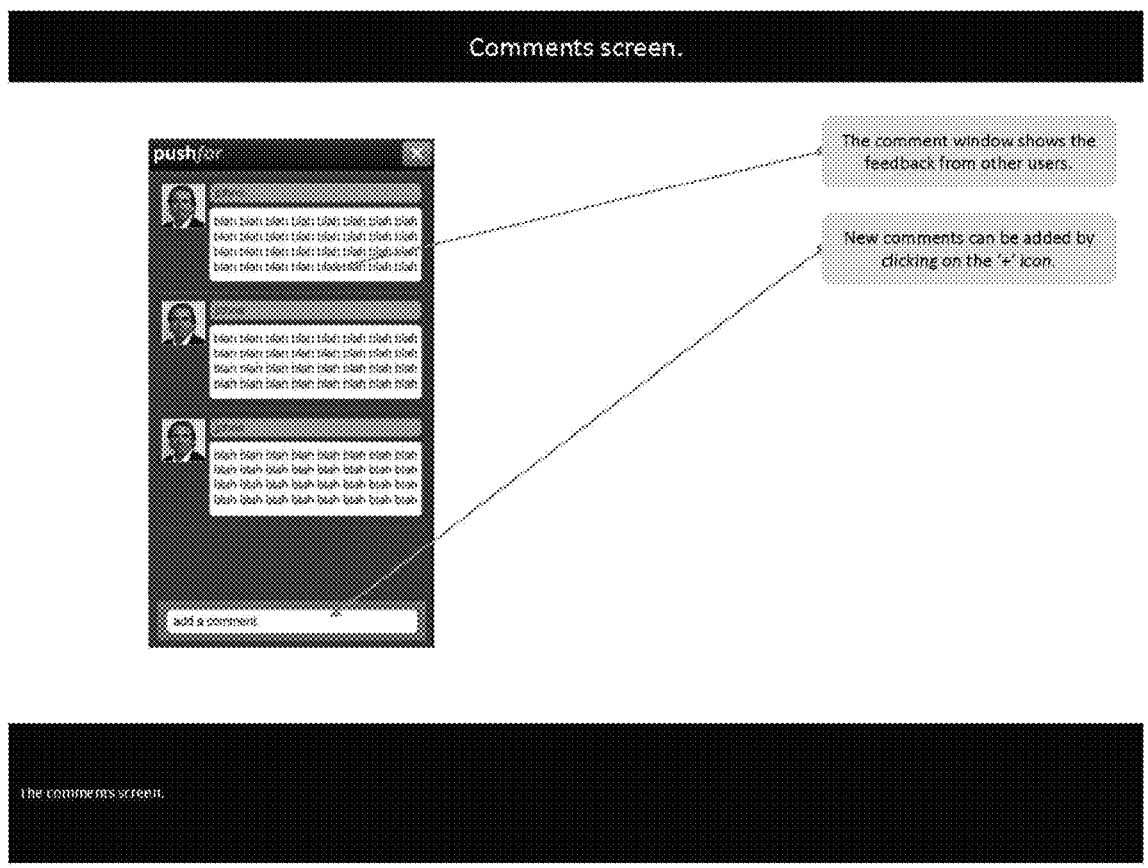
Figure 46:
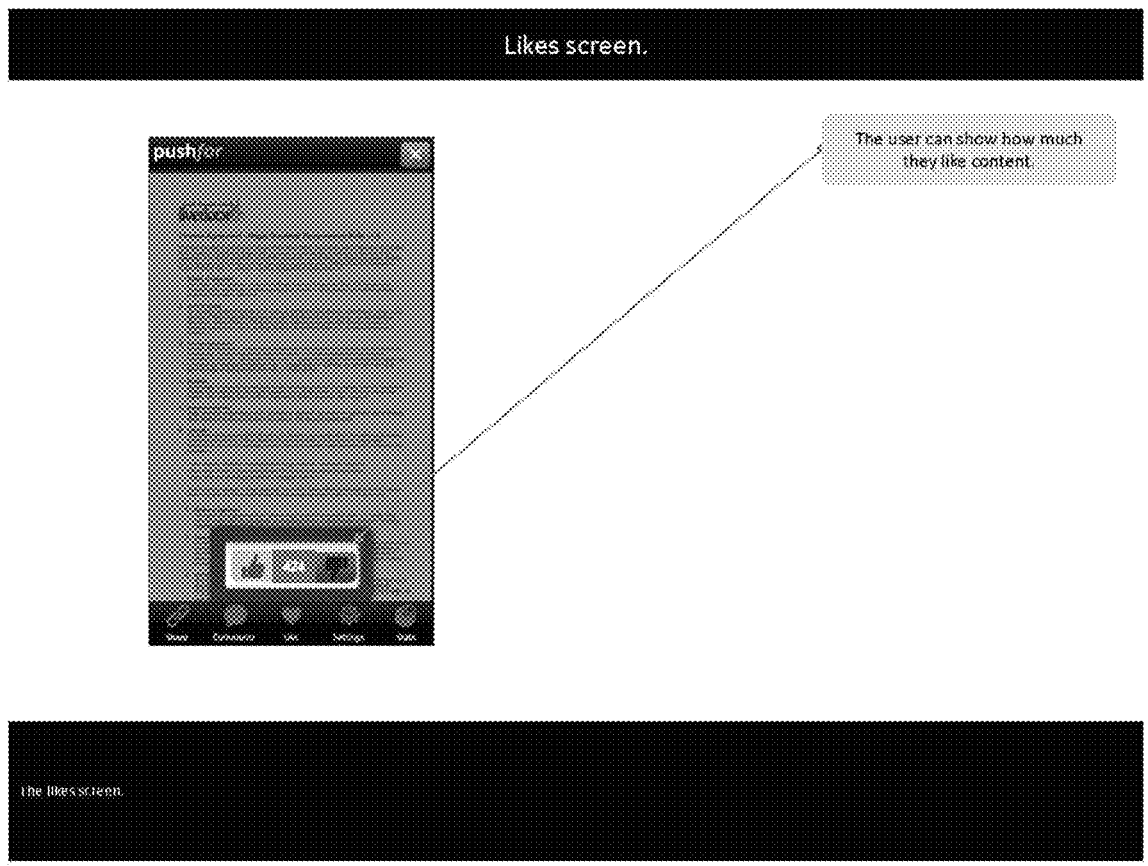
Figure 47:
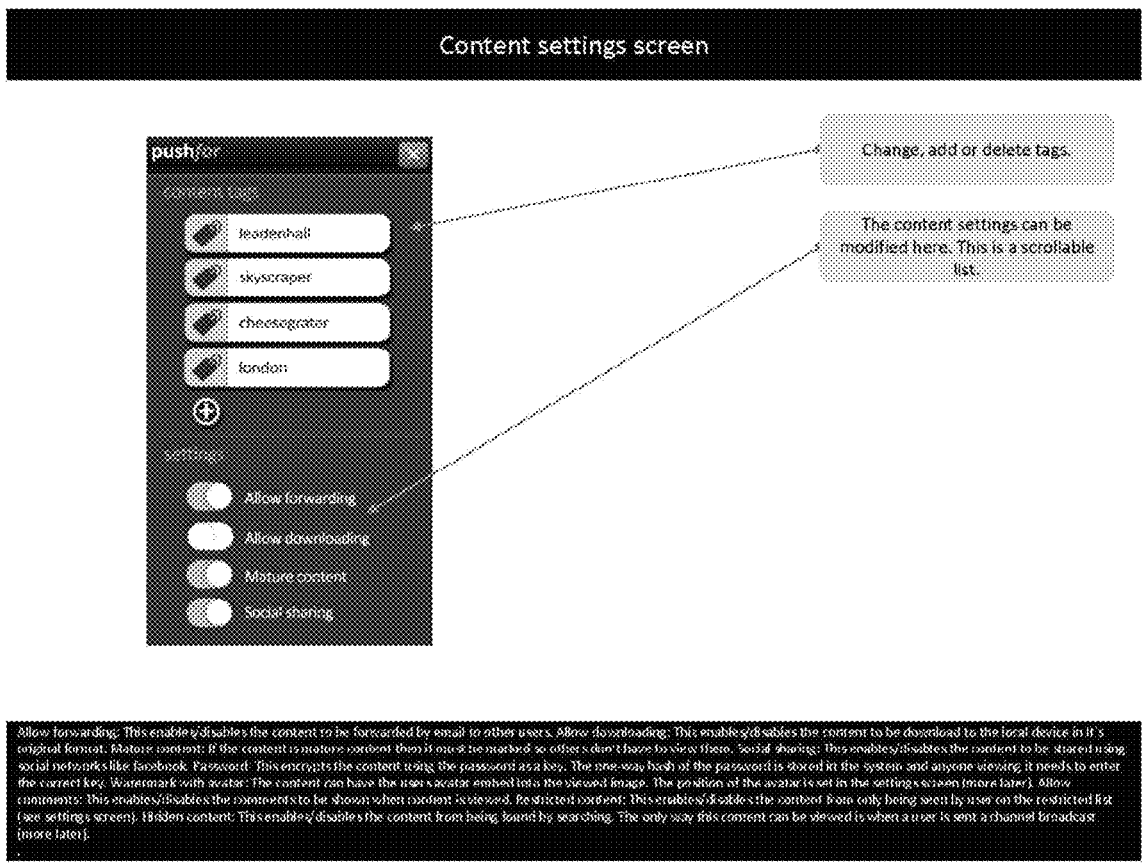
Figure 48:
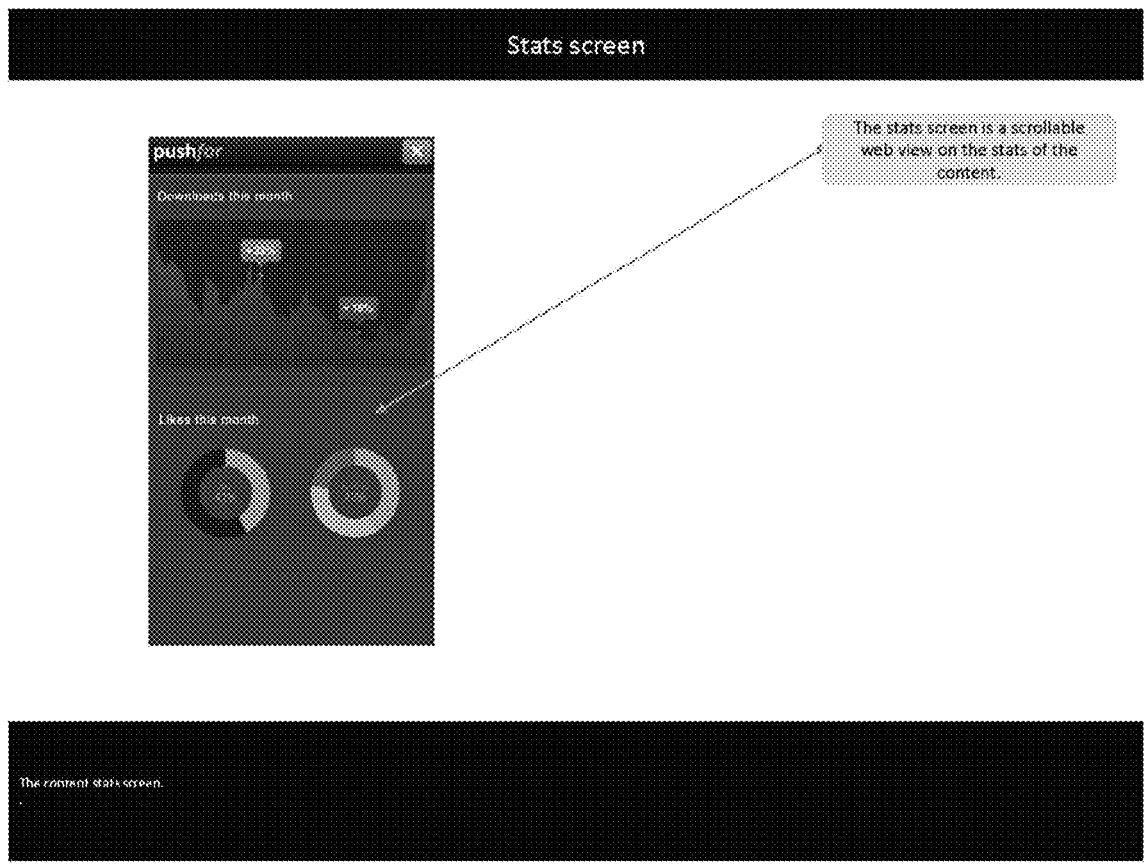
Figure 49:
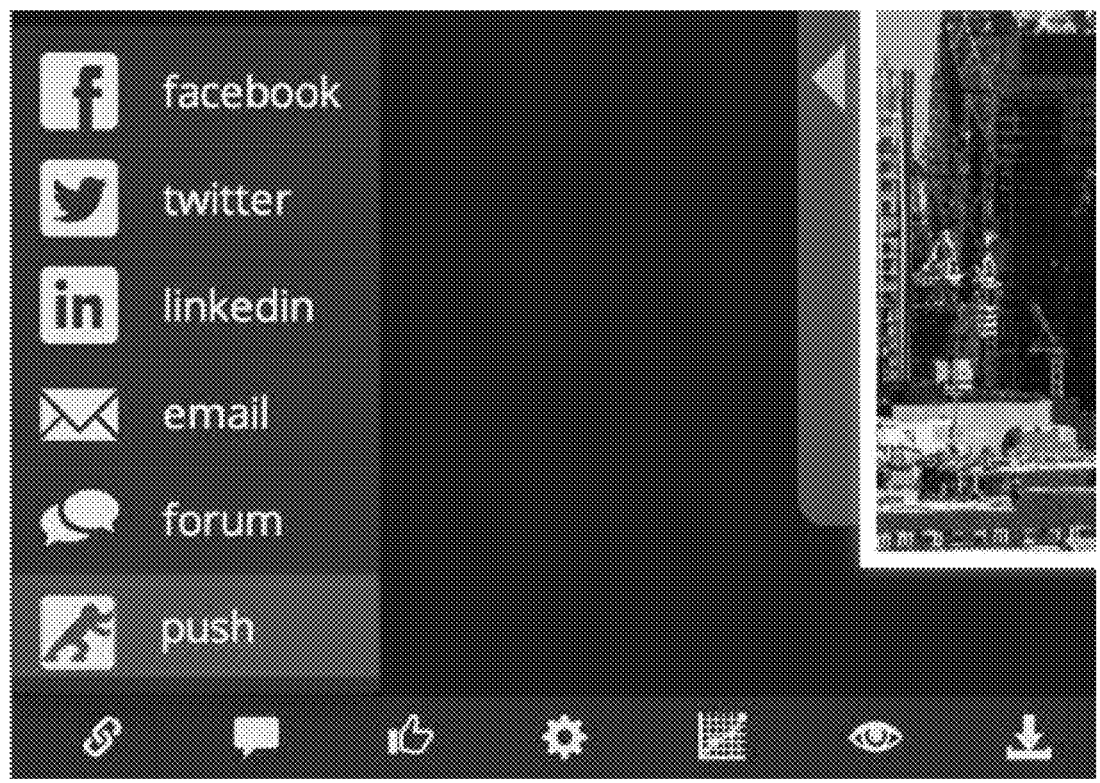
Figure 50:
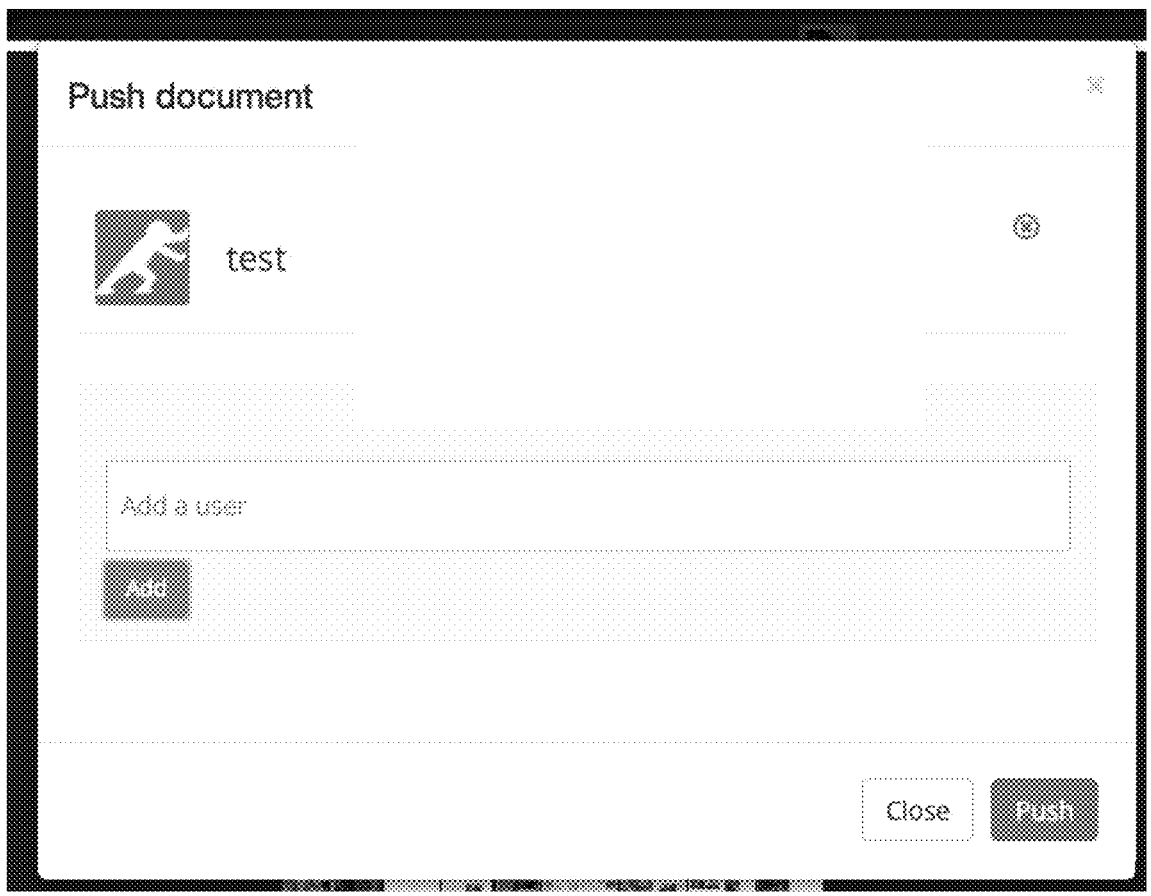
Figure 51:
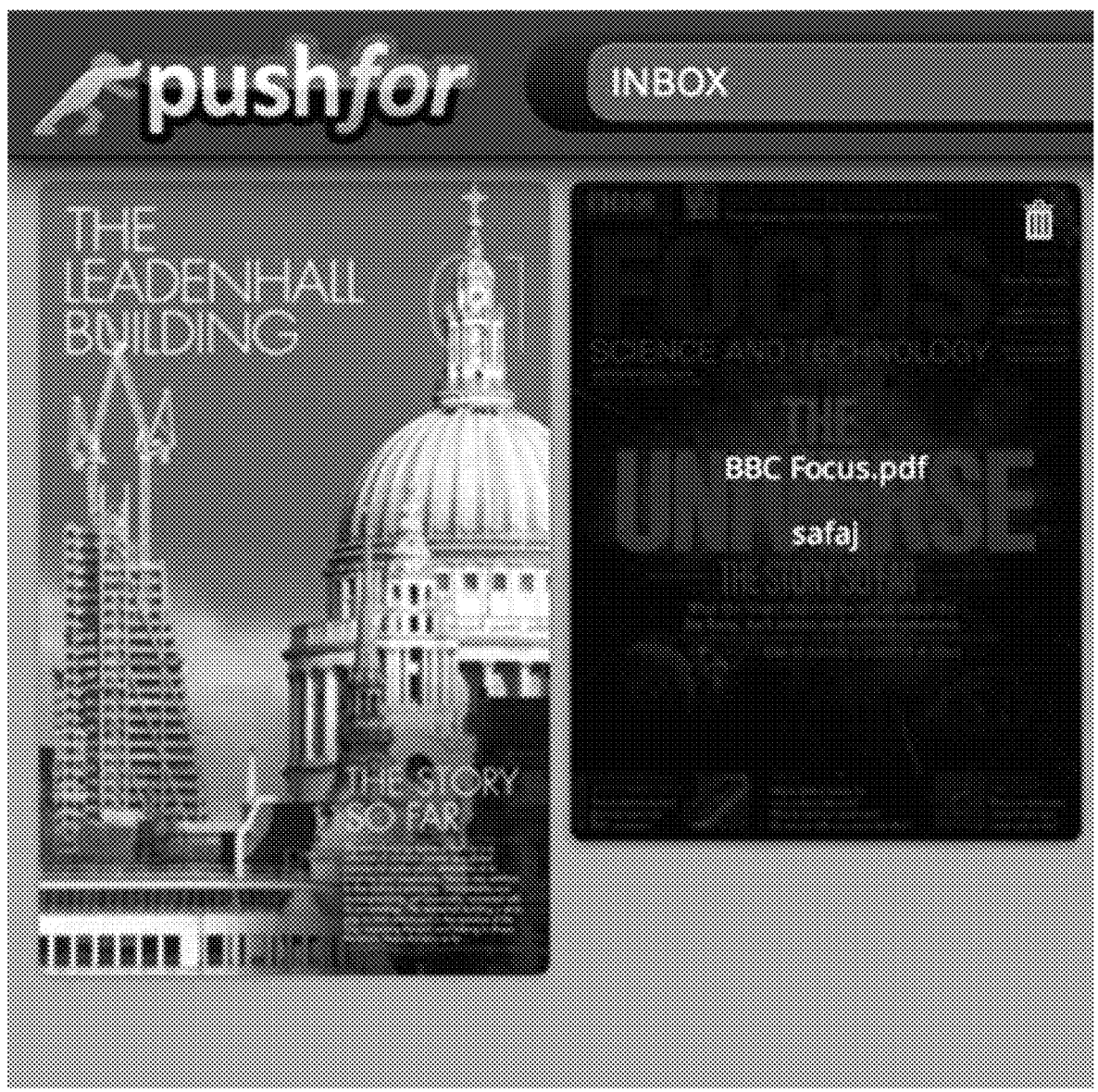
Figure 52:
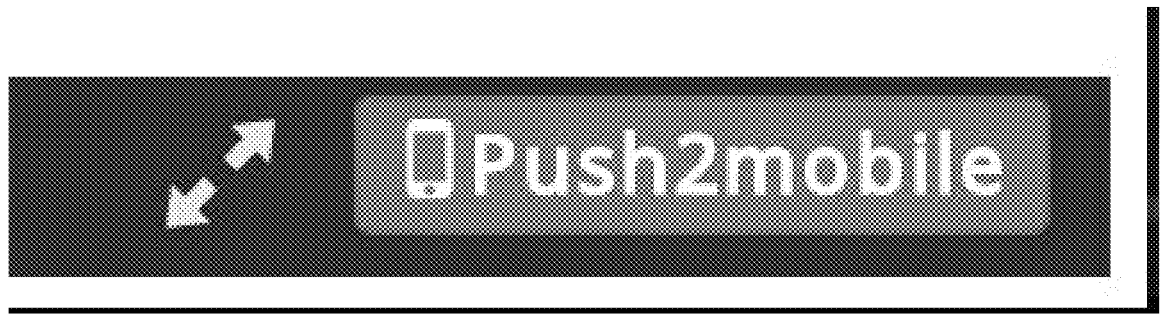

The transmitting user uploads content from their mobile or PC or other device and tags each piece of content with descriptive tags e.g. 'building' as shown in FIG. 27, so that it can be found easily by recipient users. Tags may include any kind of alphanumeric string that is associated with the content. Each piece of content is given a unique ID and the tags are stored as metadata associated with the content. Content needs to be displayed on a recipient user's device without requiring the associated apps being present e.g. Word for doc files other kinds of files. This is accomplished by converting all of the uploaded content into a standard format that can be used across all of the recipient user's respective devices. In the preferred embodiment, it is HTML5 format so that it can be viewed on new browsers and mobile devices that are HTML 5 compatible, regardless of the underlying hardware or operating system. The process of conversion can be undertaken on a separate server and processed using a queue system. The HTML5 is stored alongside a thumbnail view and an encrypted copy of the original file onto a file system (one example is the Amazon S3™ system). An transmitting user can set various attribute values to be associated with the content so that it has different properties when displayed to a recipient user. This could include password protection, restriction of download, hidden from searches or prevention of it being forwarded. The setting of attributes doesn't change the content but only how it's viewed or operated by a recipient user.

Transmitting users and recipient users can create custom channels which groups content based around tags and users. A channel doesn't contain any data (like a drive folder) but references content using their tags or an transmitting users' user name. An example of a channel could contain tags 'painting', 'drawings', 'sketches' by the user 'Leonardo' and the channel could be called 'Leonardo da Vinci artwork'. In the preferred embodiment, the recipient user maintains an account on the central server that contains at least one channels specified by the recipient user. This would be a data structure associated with the user that specifies a list of criteria for that channel. Transmitting users also upload content into the system and it is converted, and tag data associated with that content. When the recipient user accesses the PushFor system from the remote device and selects their channel, the system runs a search for all content whose tag data matches or satisfies the criteria comprising the recipient user's channel. That search result is transmitted to the recipient user's device in the form of one or more thumbnail images, which may also constitute hyperlinks to select in order to download the converted file so it can be viewed.

Recipient users are shown content as thumbnails images of one of the pages of the original file so they can see lots of references to content on one screen. The platform looks at the content attributes and then changes how that content can operate with the display program. An example is if the transmitting user has input commands into the system to associate controls to a particular piece of content that disabled forwarding or downloading then the recipient user will be unable to do the restricted operations on that piece of content. The content is not changed to undertake this operation.

Transmitting users can share their content within the predefined channels using an option to 'share the channel'. As a channel is shared the platform prompts if the transmitting user wants to change the tagged content to become hidden. This process is done because some transmitting users may wish to share content that is private and not available to other users but have forgotten to set the content to be hidden when it was first uploaded. Next the platform requests an optional access password from the transmitting user to secure the channel. The platform generates a unique platform ID ("PID") and URL ("channel URL") which is given to other recipient users. The channel ID and hash of the access password is stored in a database for later use. The channel URL would look something like this: www.pushfor.com/channel.php?pf0000000001 ("channel URL")

The recipient user receives and clicks on a channel URL which takes them to the Pushfor website. The platform detects from a cookie on the recipient user's local browser operating on their device if they have already got an account. If the user is new then they will be guided through a sign up process or logged in. The platform takes the channel ID from the URL and reads from a database the optional password and then prompts the recipient user to grant access. If the password input by the recipient user is valid then the channel name that the transmitting user set is read and displayed in the channel bar on the screen. The platform reads from a number of tables to determine the filters set for the channel. The filters are then used to parse a NoSQL metadata database to find the content IDs that match the filters. The content ID numbers act as references or unique pointers into an Amazon S3 bucket or data structure that holds a thumbnail view of the content, a HTML5 version for viewing purposes and an encrypted and compressed copy of the original file. The recipient user's user ID is stored in a database to record when, where and how they have viewed the transmitting user's channel. The transmitting user can view the recipient user access information and block access to a channel to specific users if required.

Content that is uploaded may have more than one tag associated with it. The content owner can upload the content and then select to tag it and associate a label with the tag. The user can either select pre-existing tag labels or create their own tag labels. For example, a pre-existing tag could include a reference to an "image" or "document", while a user tag could be "Summer Vacation 2013." The tags can also be labeled with the user name, or some other subject describing the content or content type. Any number of tags can be attached to a content item. Automatic tagging may also be used. In this embodiment, a date/time stamp is attached as a label to a tag. In other embodiments, the system can run a facial recognition software application to identify persons in an image comprising the uploaded content item and automatically associate tags with the content item that are labeled with the identities of the detected persons.

The content that is uploaded is converted into a file type that can be viewed on any device. In the preferred embodiment, the content is uploaded and converted into a high-resolution image so that as a user views the document, they can zoom in and still have sufficient fidelity. In one embodiment, the image is converted into svg format or into PDF format. In another embodiment, the content image is converted into a lower resolution thumbnail image for use when displaying a catalog of content.

In yet another embodiment, the server that distributes the content to recipients can maintain analytical data that indicates which content was selected for viewing and for how long it was viewed. In this embodiment, content selection requests that are received are logged in a database so that a data record associated with the content captures the time the content was transmitted and the period of time until the next selection occurs or the application is exited. The display application running on the recipient user's device can also run a timing function in javascript and send the time value up to the server with appropriate identifiers to tie the value to the content and the viewing user. This elapsed time is stored in the data record associated with the content. The information may be used in the aggregate to show analytical aspects of content use by the users. The data record may also store an identifier associated with the viewing user so that characteristics of the viewing users may be correlated with their selection of content or their use of the content.

In one embodiment, the content owner can control other metadata associated with their uploaded content that controls how it is shared. In this embodiment, metadata options may be selected for the uploaded content in order to encode use privileges and/or permissions to further share the content. In addition, the sharing of content can either be by content or by reference. In the former, the viewing user receives the content as a file. In the latter, a hyperlink is transmitted to the viewing user who then can view the content via the activation of the hyperlink.

The hyperlink that references the content is a link to a webservice that shows image or images in an environment, preferably an app operating on the viewing user's device or an internet browser. When the link is activated, the link brings down scripts from the service that launch the user interface that interacts with the servers that hold the content. The viewing user can view the image that is the content, but that user cannot save it to the local device or modify it, unless the appropriate permission values are associated with the content. The script running the browser or app reacts to parameters representing the privilege settings that are downloaded from the server along with the content image.

The system provides the appearance of content occupying a channel. A channel is a set of tag values. If a person uploads content with matching tag values, that content is distributed to all viewing users that subscribe to those tags. The distribution system operates logical filters that lets content be displayed where tags associated with the content fit the filter. A channel is essentially a channel filter. As a result, a recipient user or content owner can create a channel by simply specifying a list of filter criteria and associating it with a channel name or index. Any content that meets the criteria will then appear in an indexed presentation when that channel is selected. The users can create multiple filter sets, each one being its own channel and having a name. Content can be private, or channel with a password protection, or public.

On IOS™ device, the App does the rendering of the image representing the content, but content and/or its image cannot be moved out of the sand box that comprises the App operating environment. More generally, on an Internet browser, the system uses HTML 5. In the case of a browser, the browser refresh button reloads the content comprising the channel for display. In the preferred embodiment, the scripts operating in the App or on the browser transmit a load command to the server in order to refresh the display on a push basis.

Push Feature: In yet another embodiment, the system can be configured to automatically push content to recipient user's devices. In this system the user retain security control and analytics without relying on email processes to transmit content.

Figure 1:
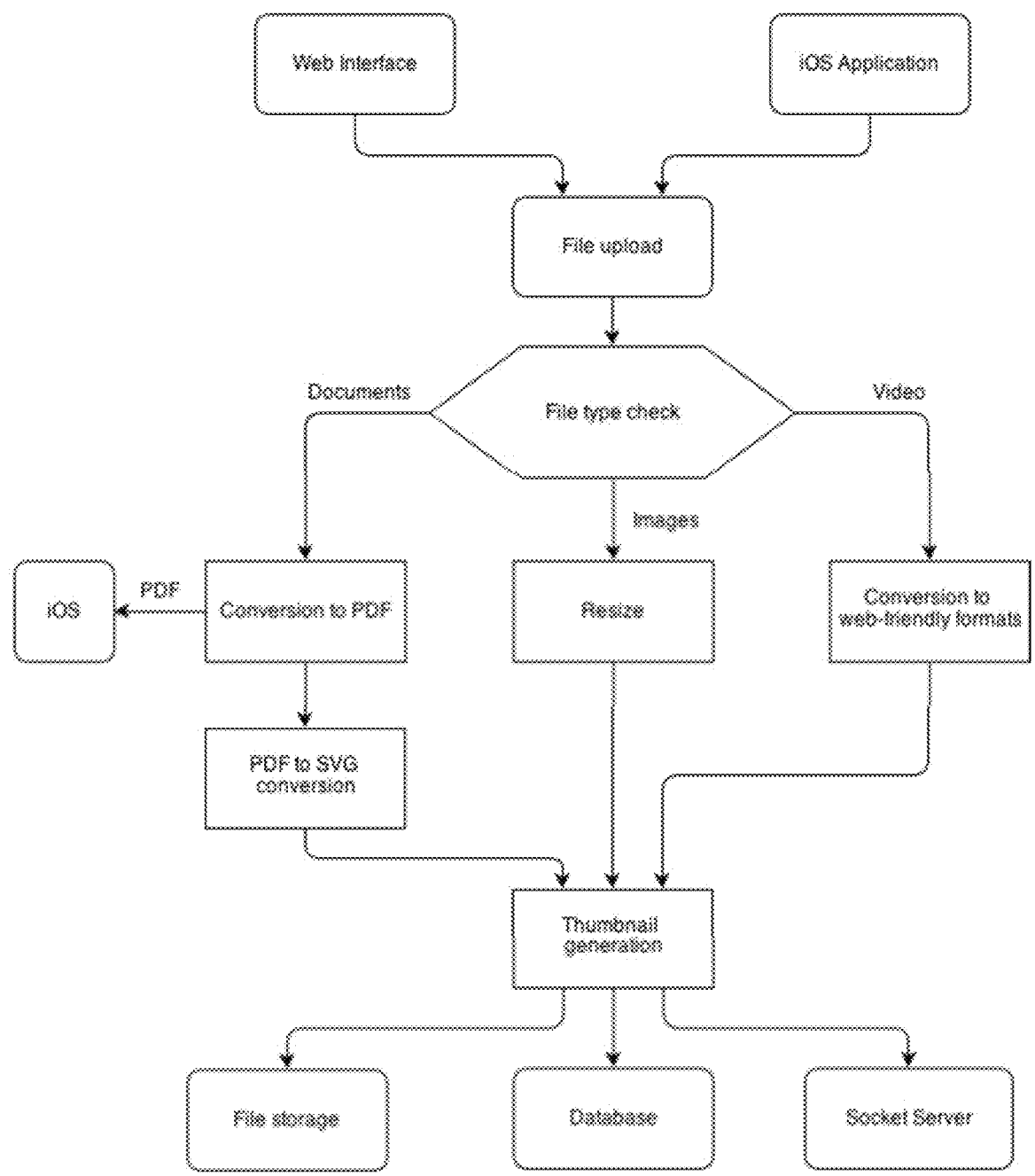
FIG. 1. System architecture
FIG. 2. Database dependencies diagram.
Figure 2:
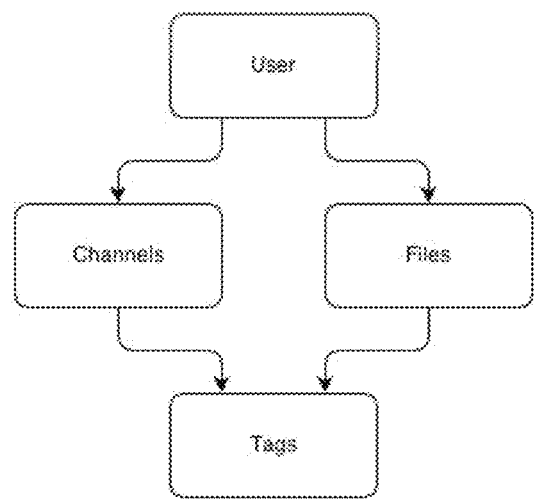
Figure 3:
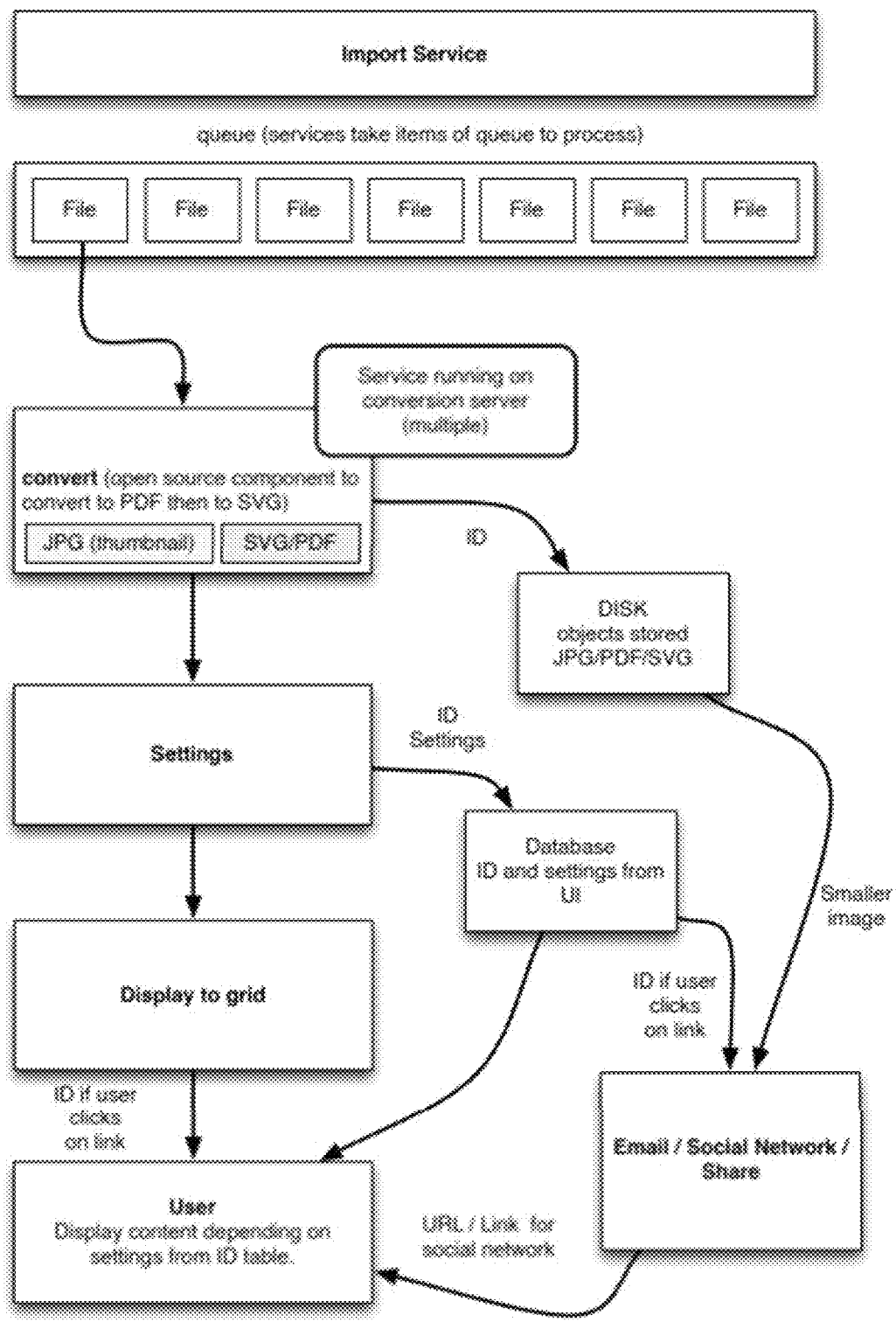
FIG. 3. File upload process flow.
Figure 4:
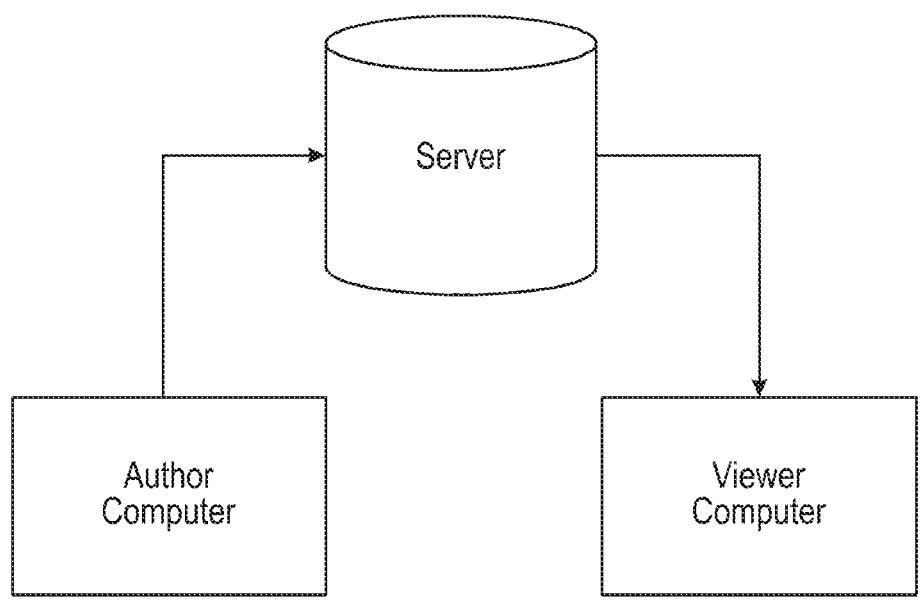
FIG. 4. System architecture with transmitting user and recipient user.
Figure 5:
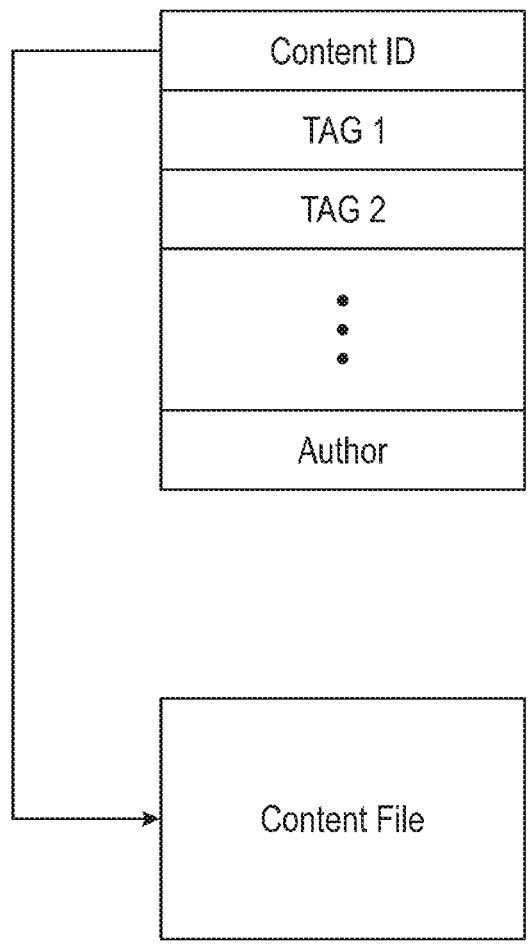
FIG. 5. Tag data structure with reference to content file.
Figure 6:
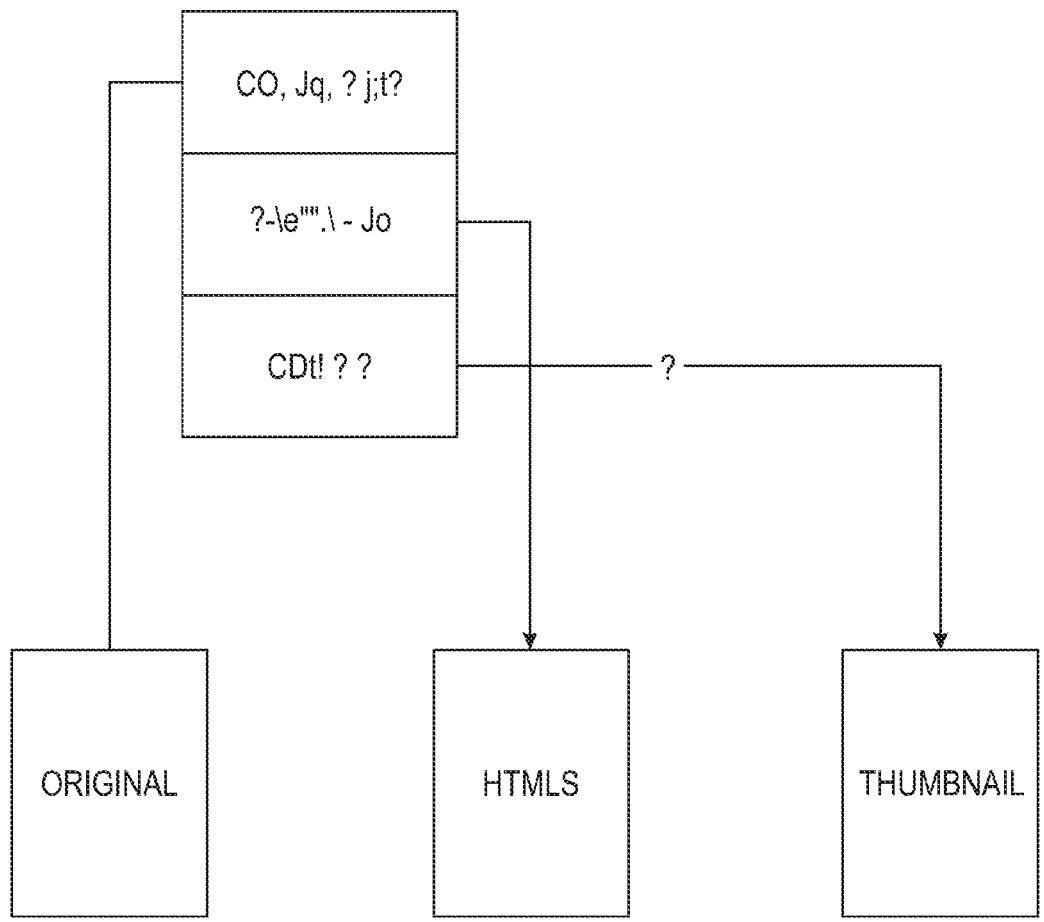
FIG. 6. Content ID data structure associating the original file, the converted file and the thumbnail version.
Figure 7:
FIG. 7-52. Pushfor user interface displays and functionality.
Figure 8:
Figure 9:
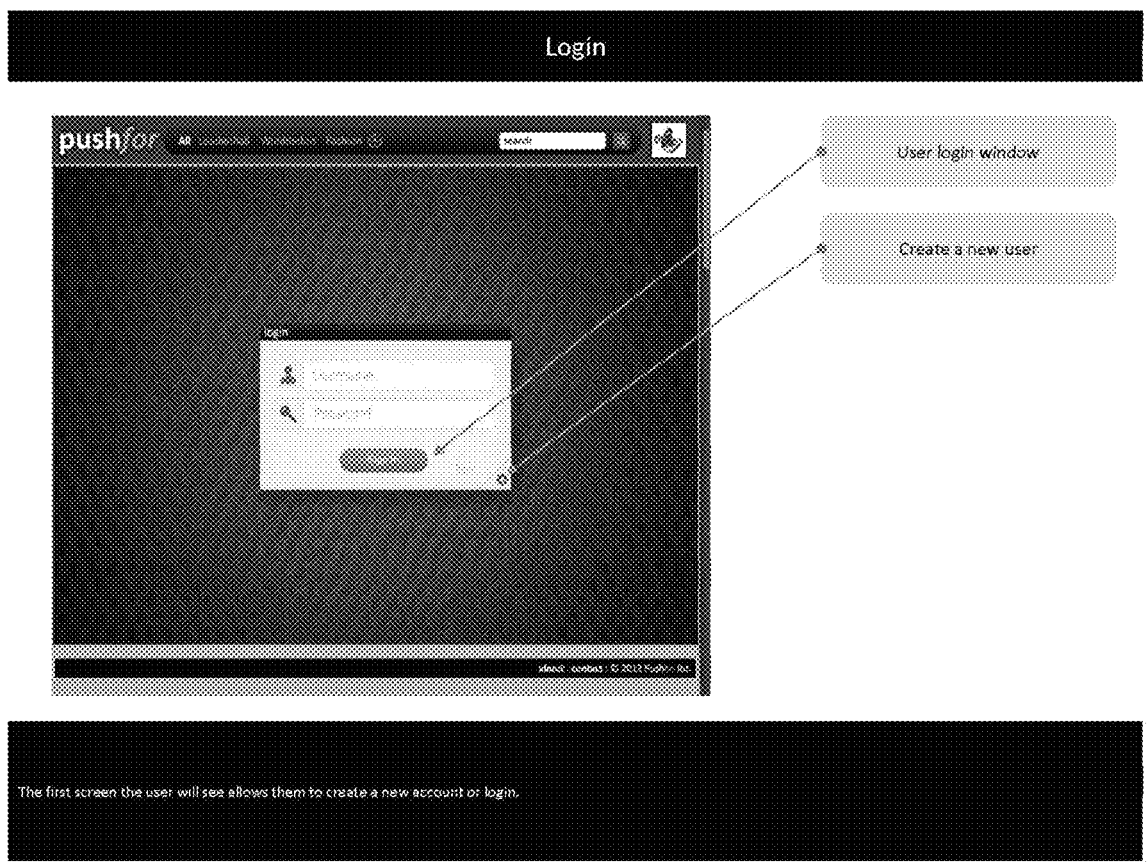
Figure 10:
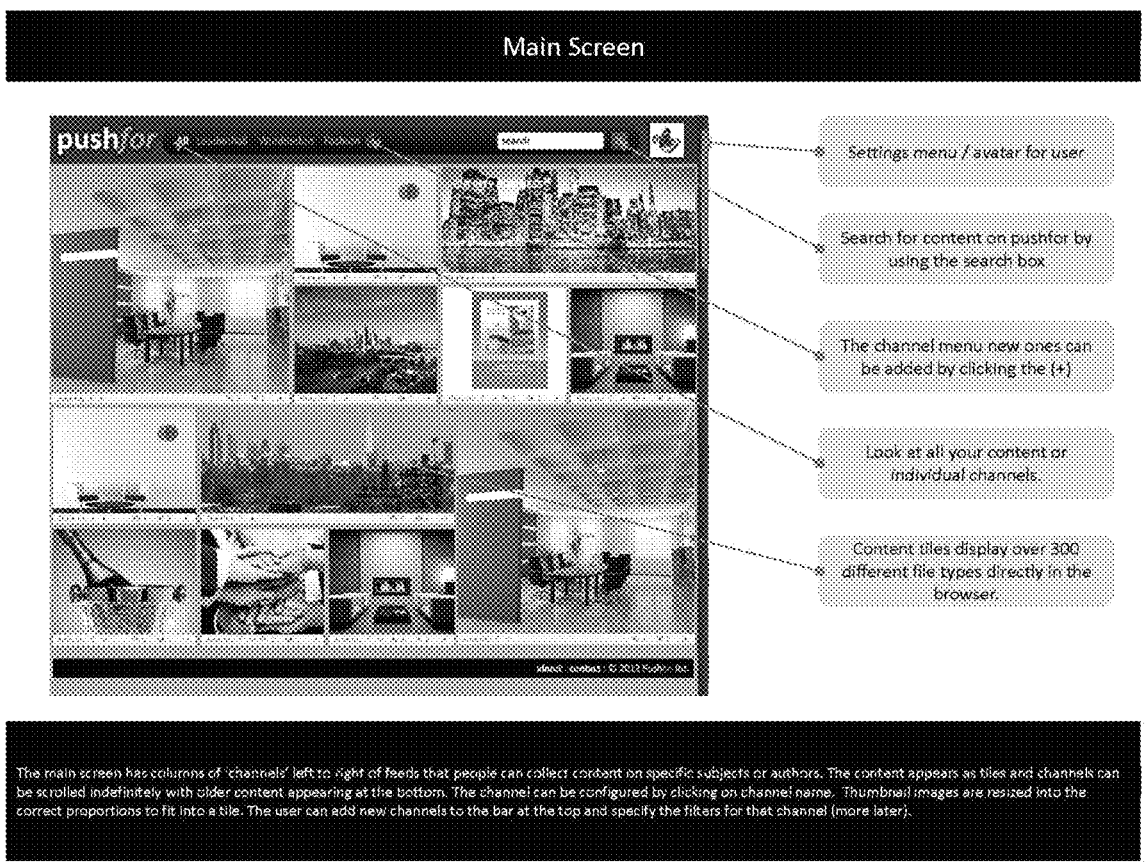
Figure 11:
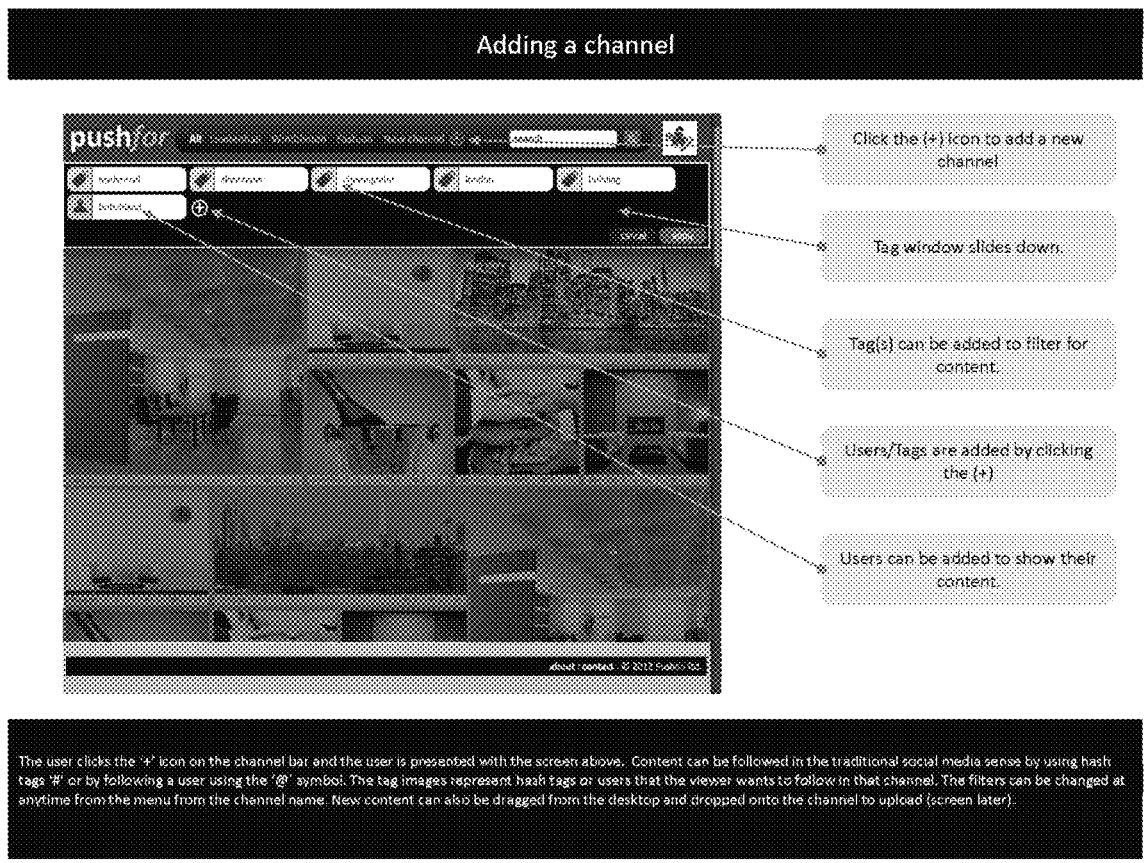
Figure 12:
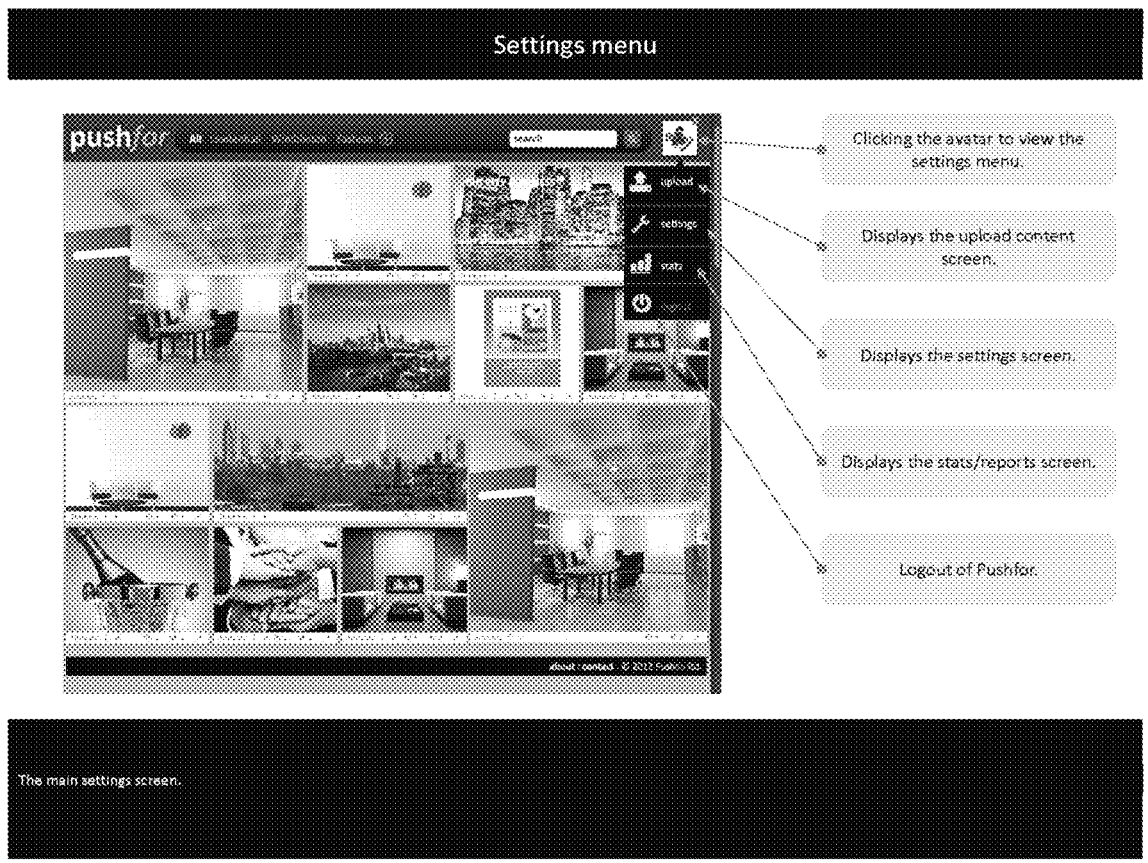
Figure 13:
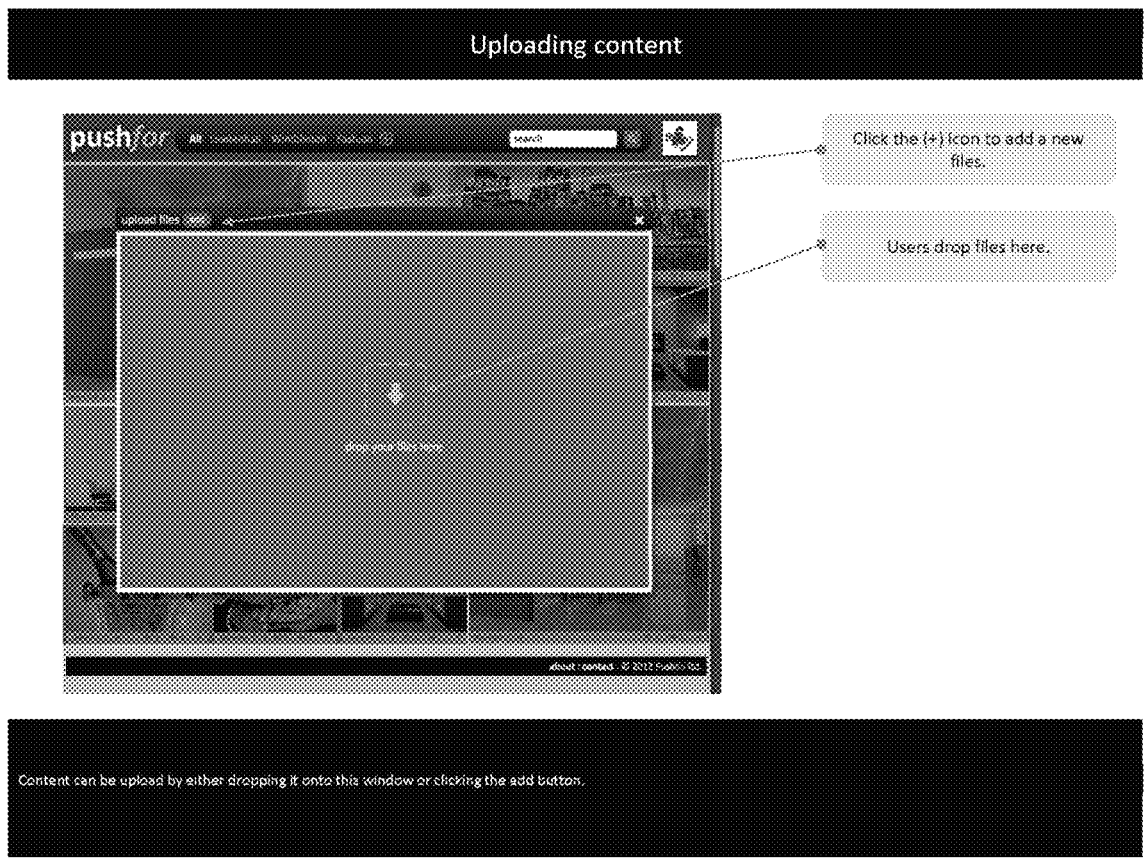
Figure 14:
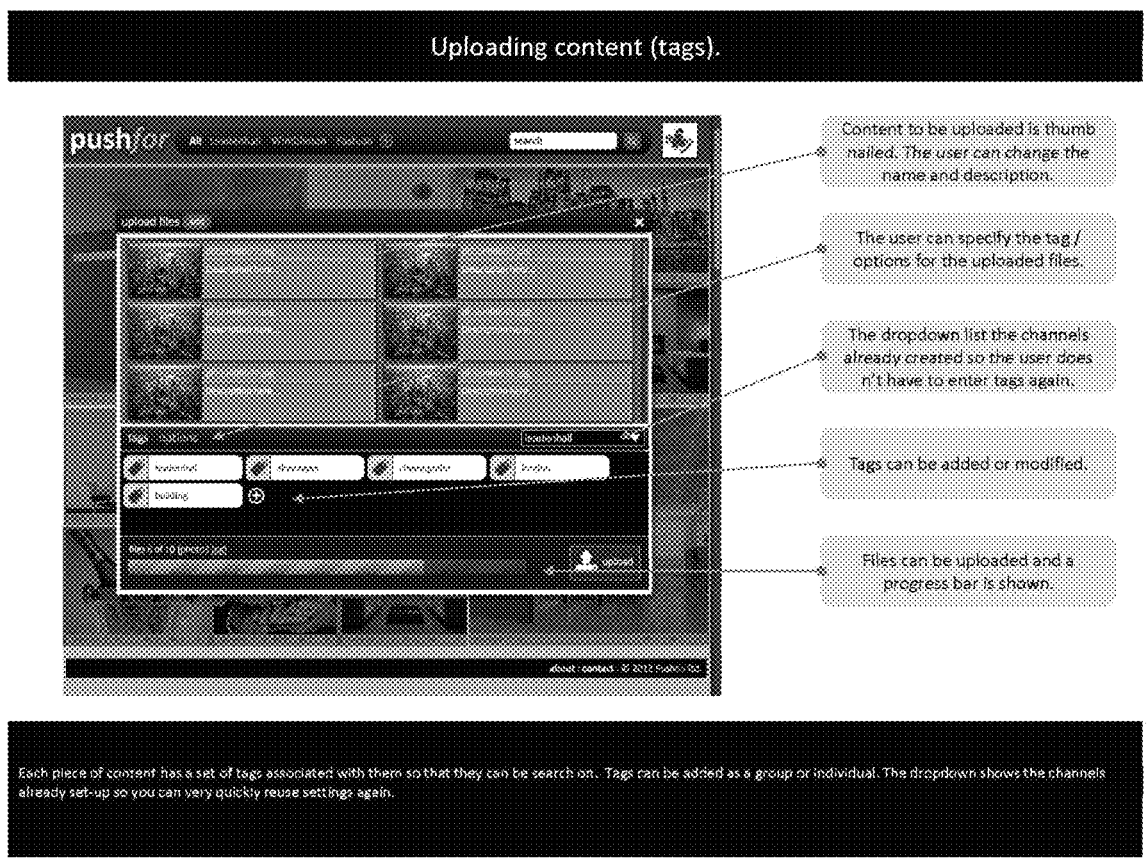
Figure 15:
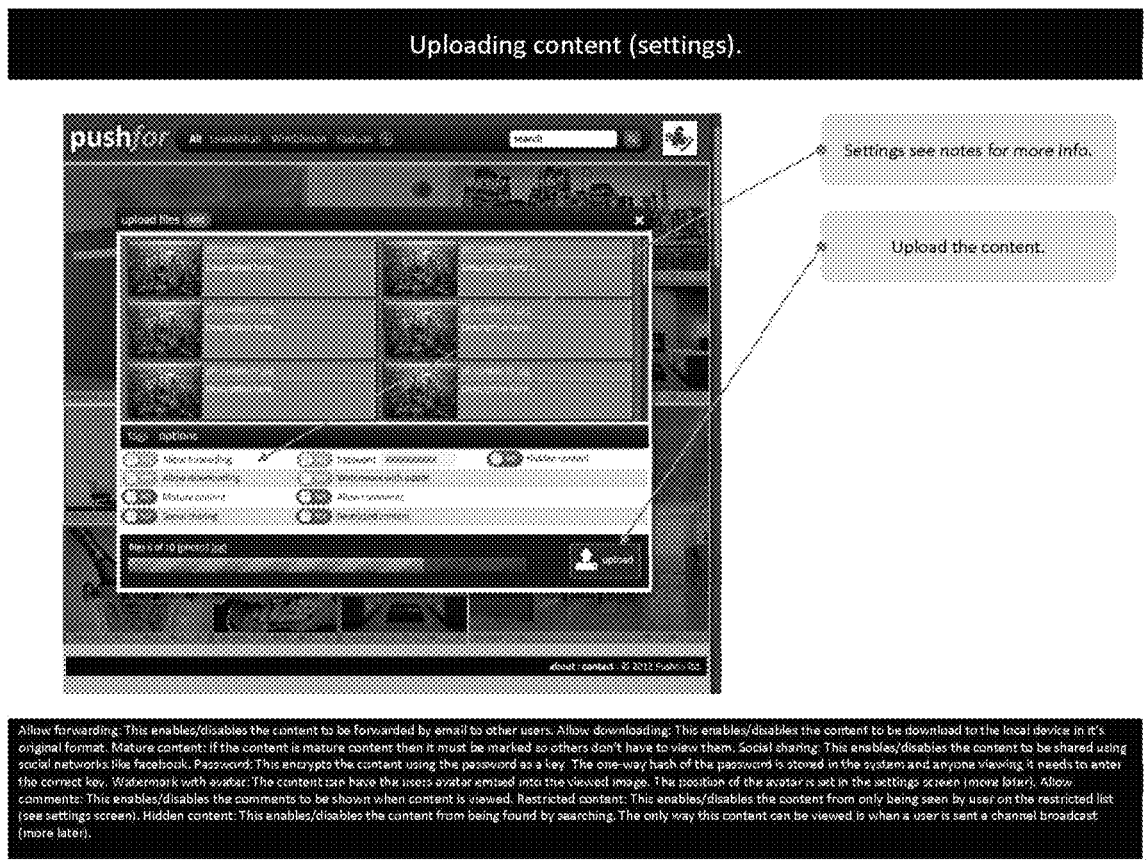
Figure 16:
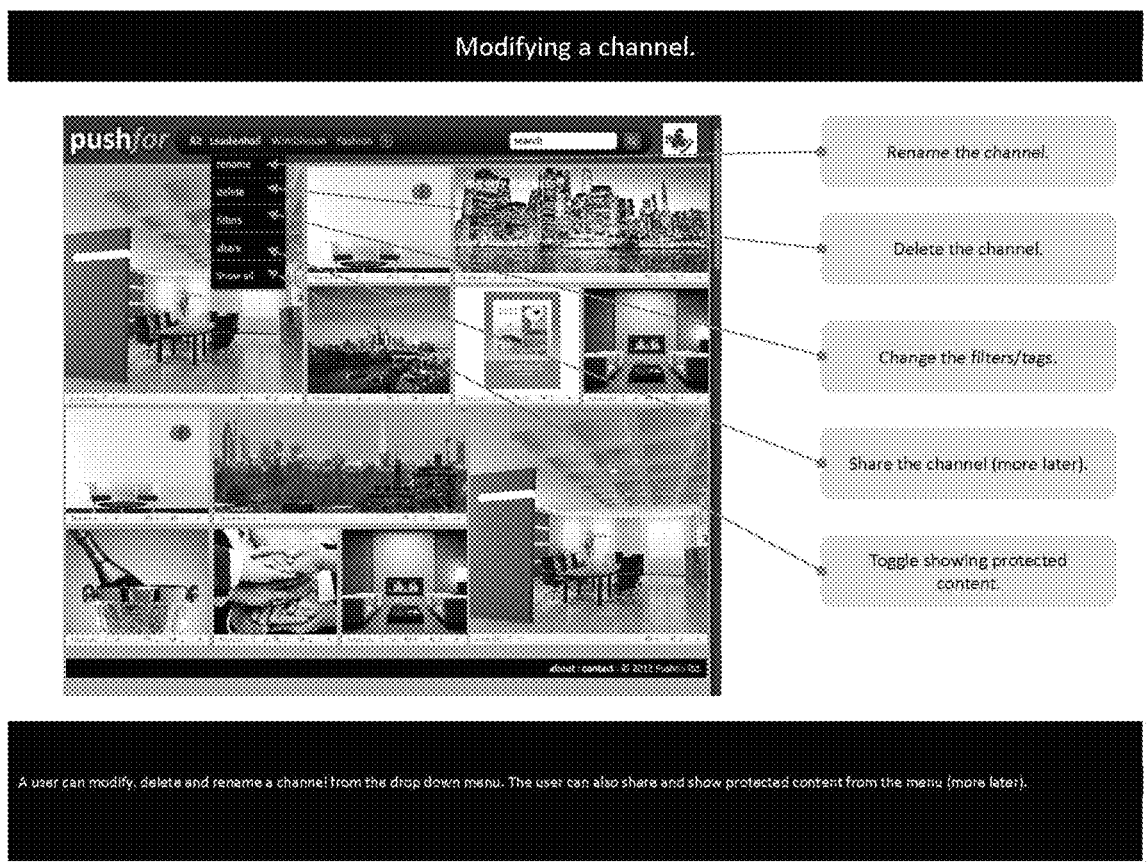
Figure 17:
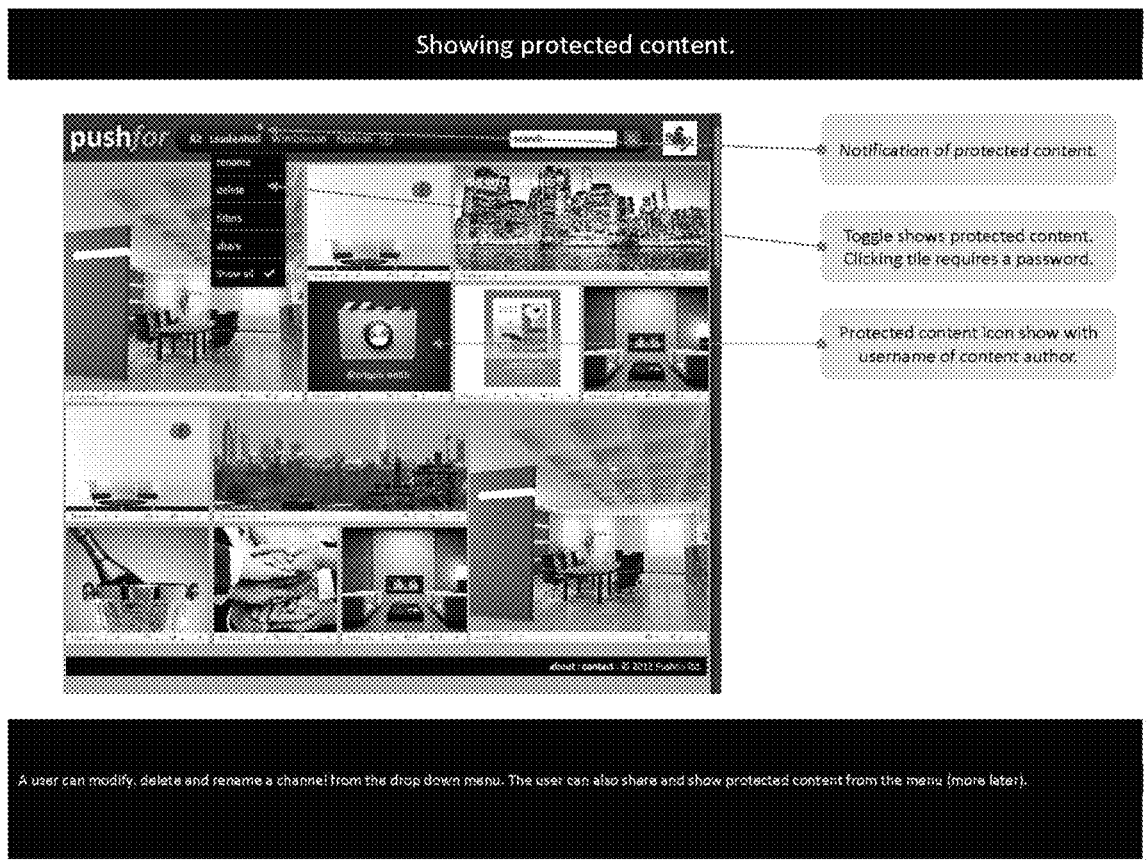
Figure 18:
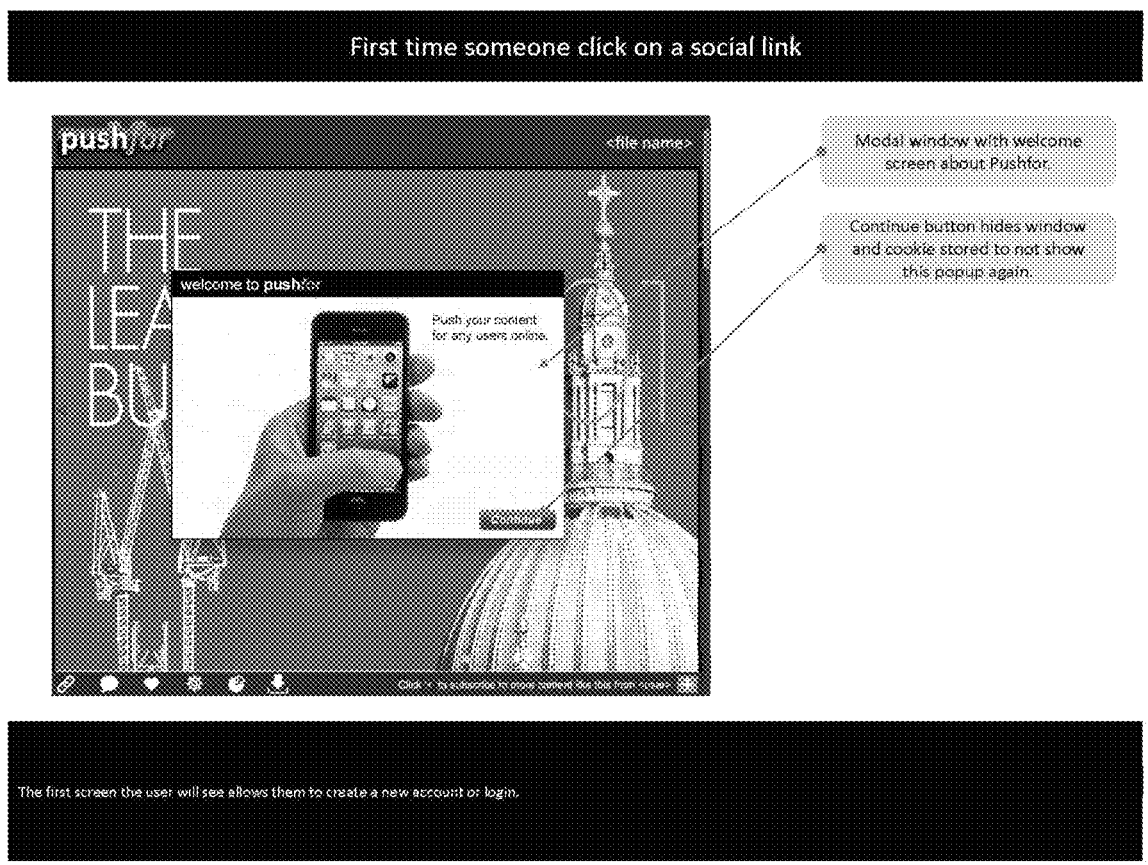
Figure 19:
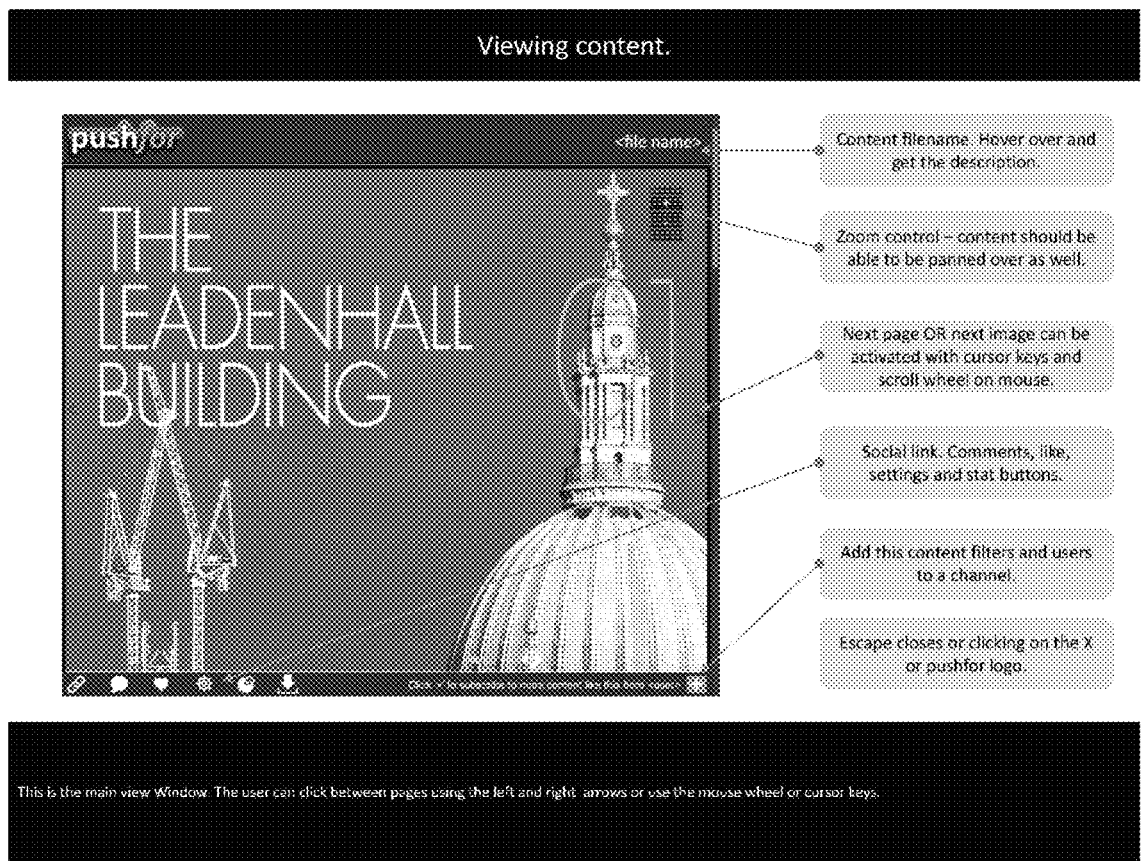
Figure 20:
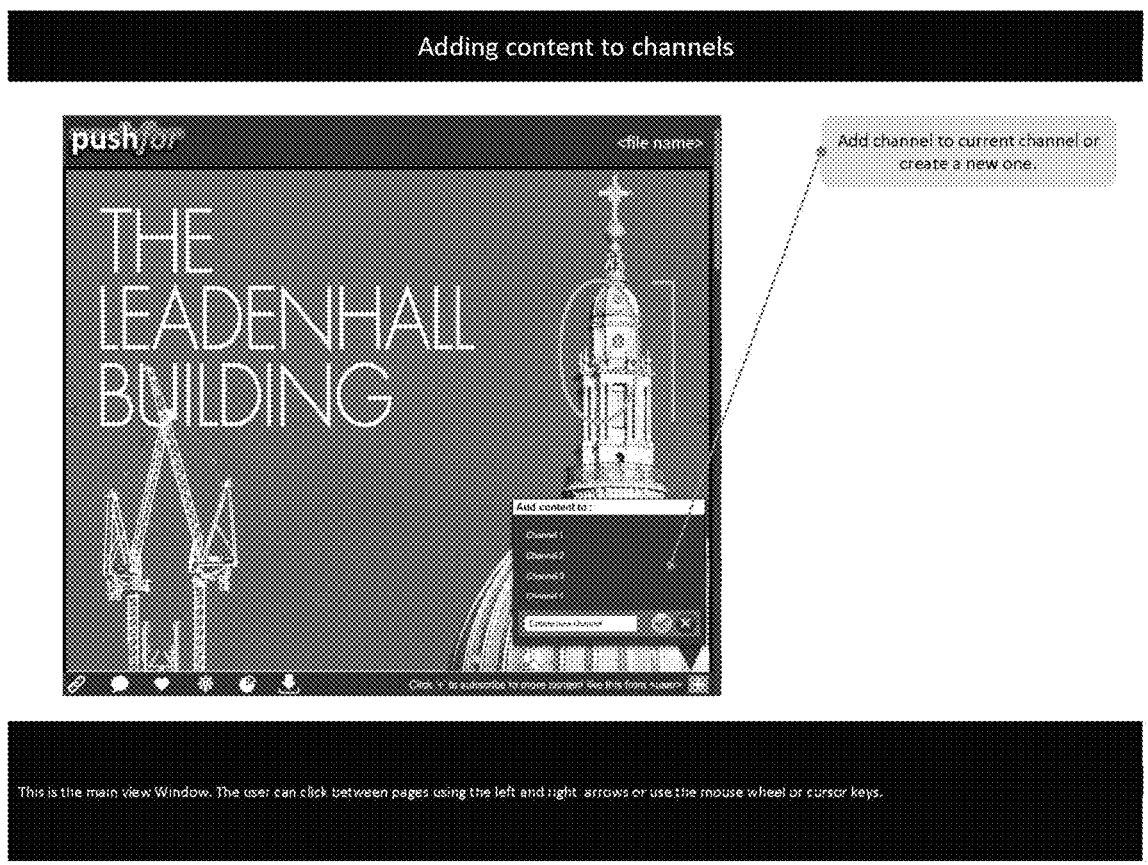
Figure 21:
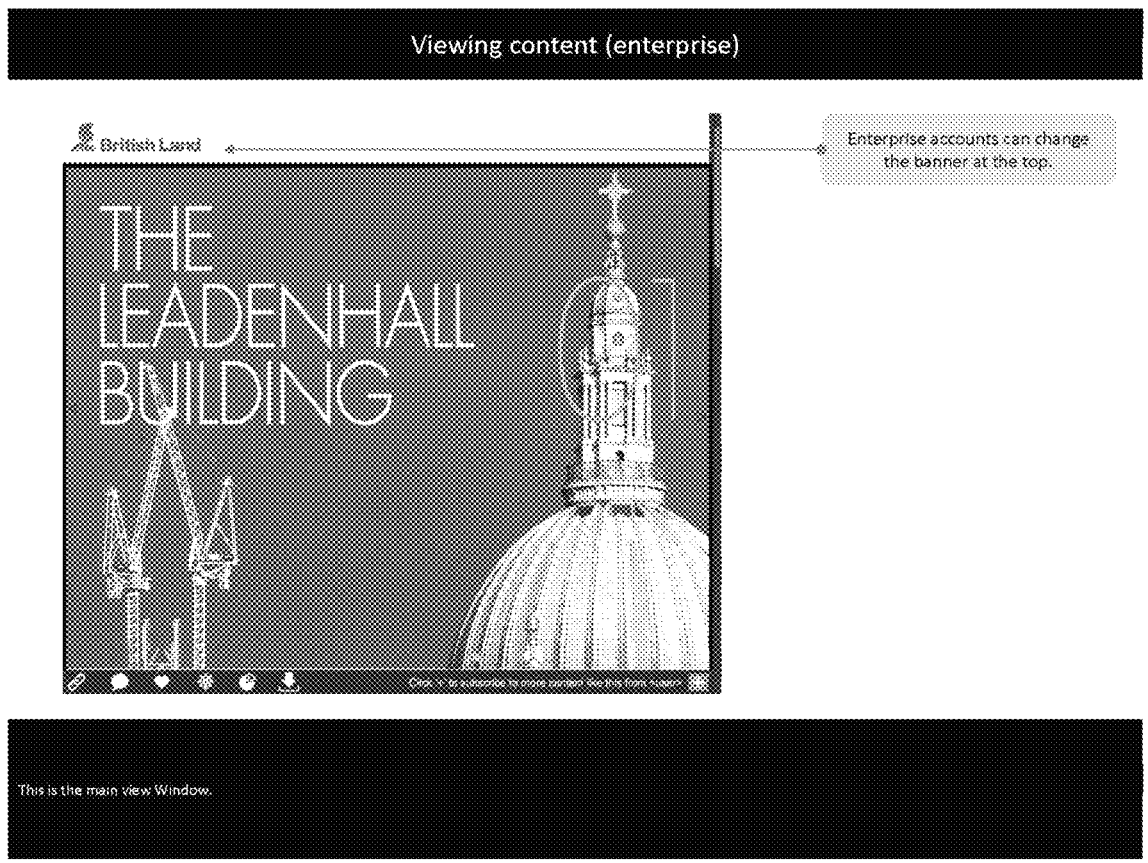
Figure 22:
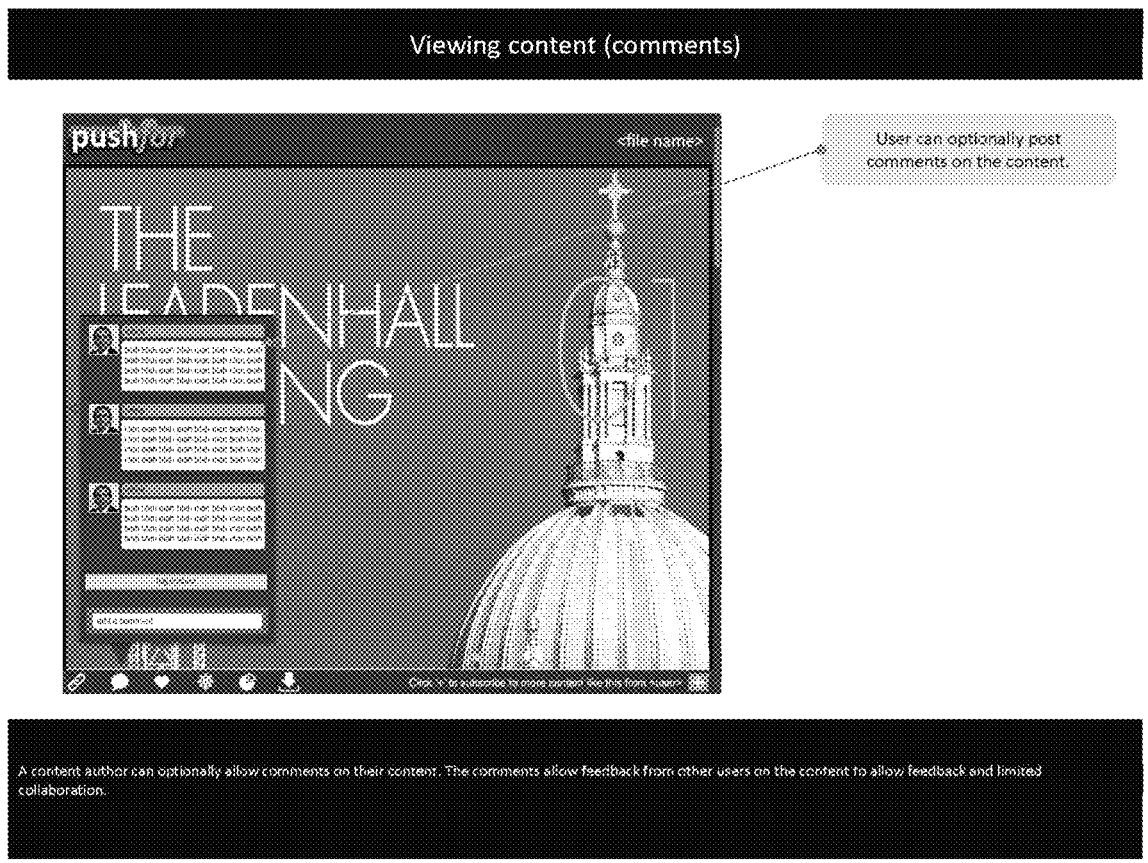
Figure 23:
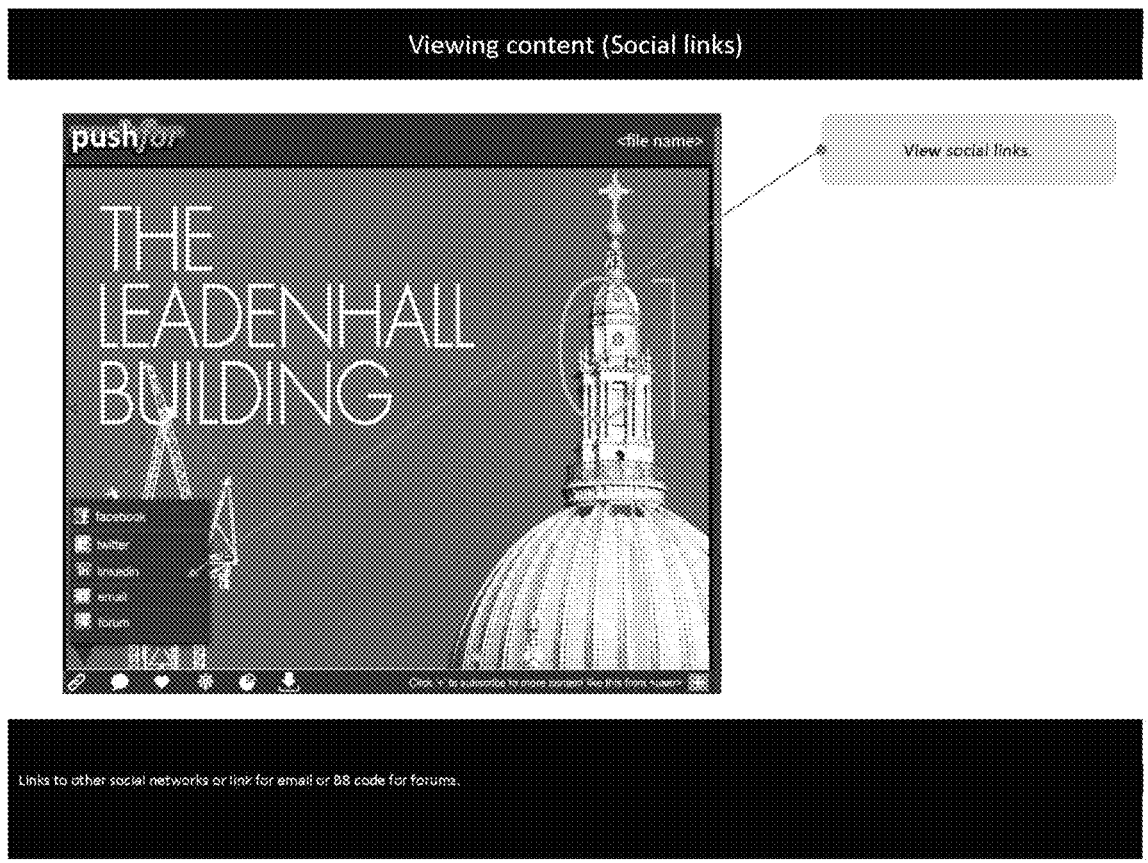
Figure 24:
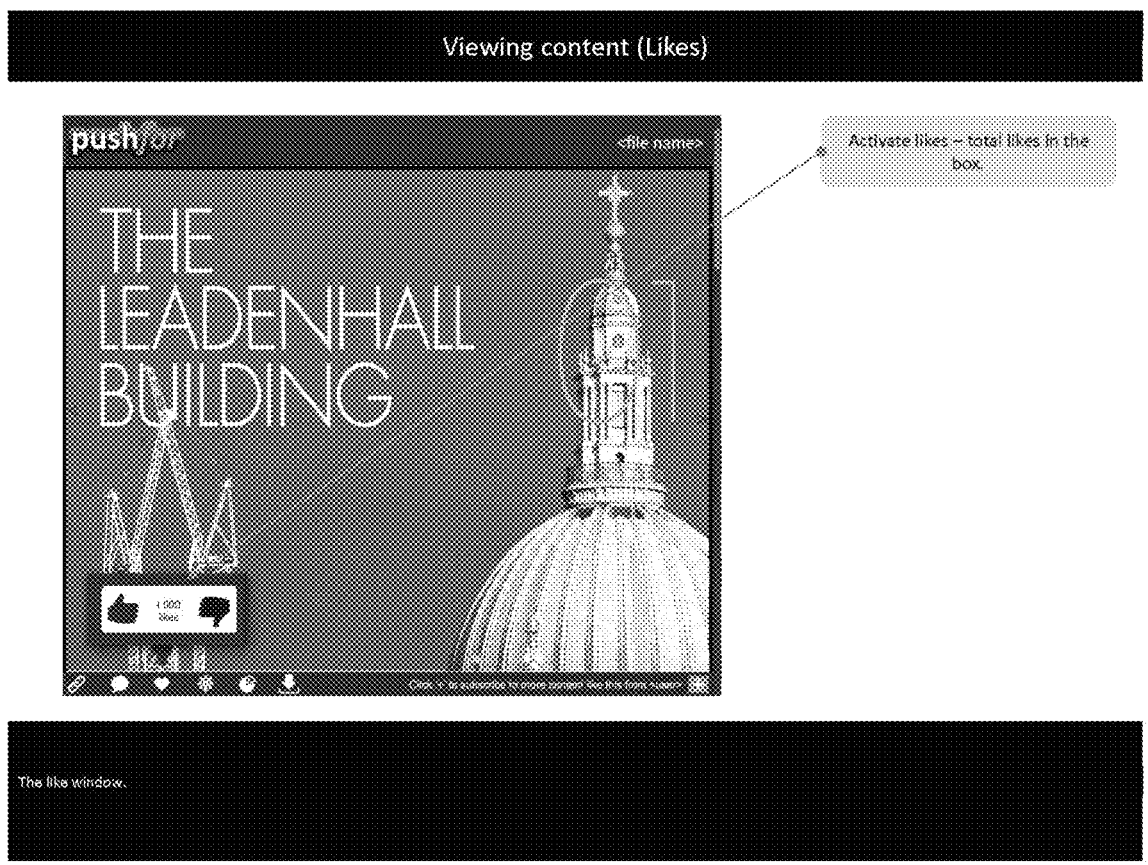
Figure 25:
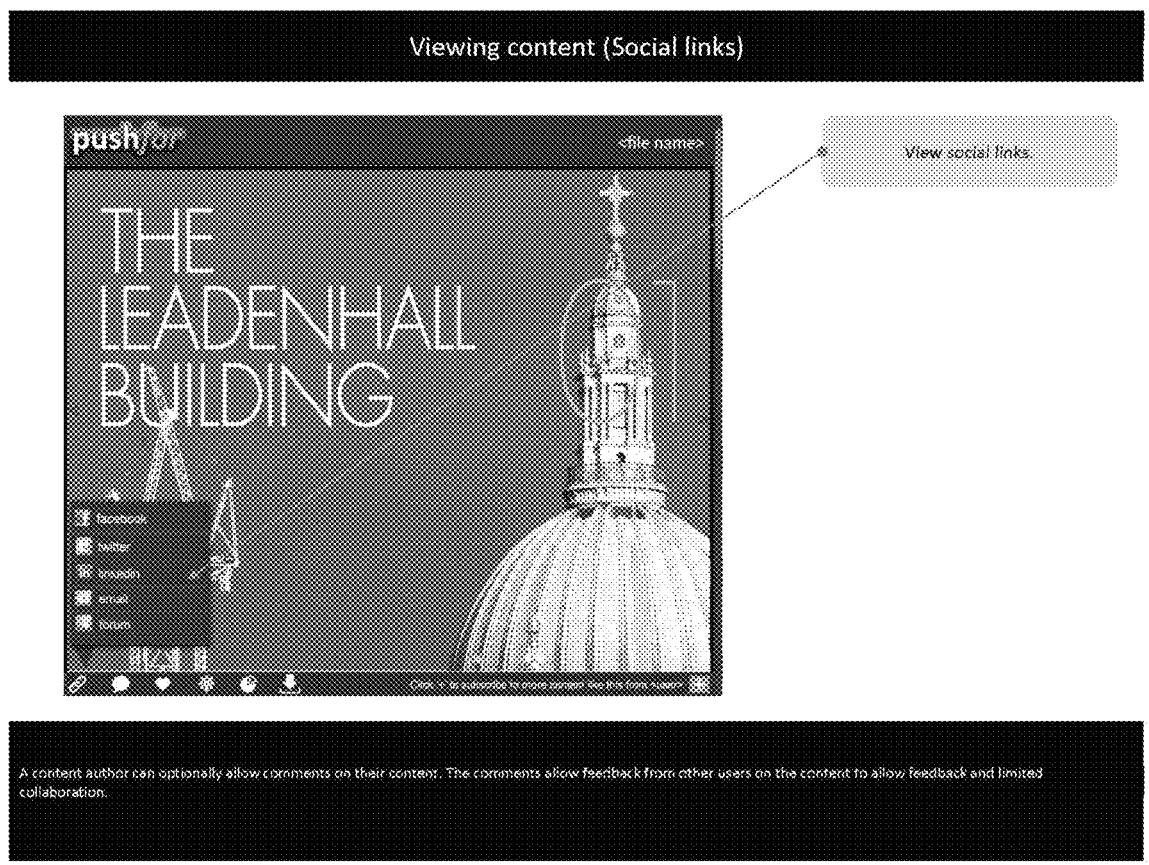
Figure 26:
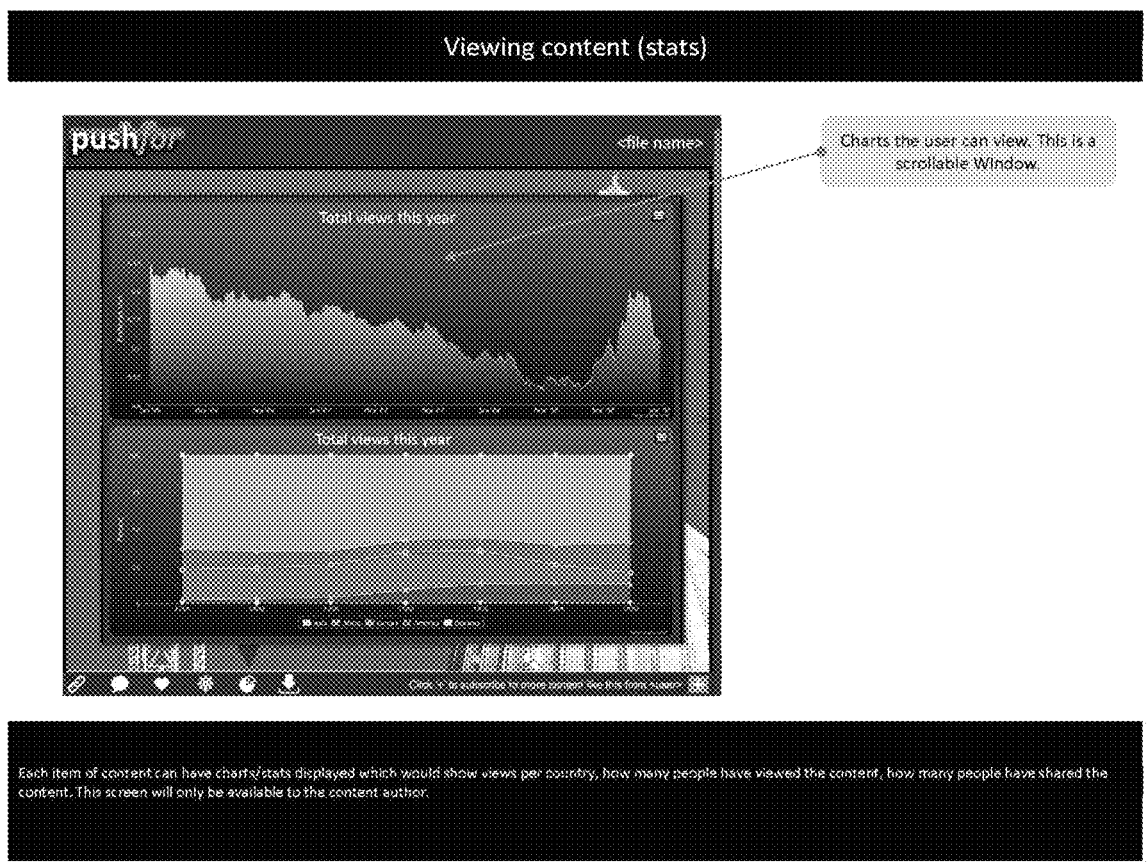

The process flow works as follows. The sending user, e.g. the transmitting user, goes into a large view and clicks the link menu icon. As shown in FIG. 2, the sending user clicks "push" and as a result an interface window popups up, which is the push window. The push window allows the user to enter multiple identifiers of multiple corresponding system users who are to receive the content that the user seeks to transmit (e.g. the recipient users). In the preferred embodiment, the window is comprised of an "add" button, which when actuated, causes a list of users that are associated with the transmitting user to be displayed. The transmitting user can then select one of these users and as a result, cause that selected user to be added to the transmission recipient list of recipient users. The user then actuates a button in the window, preferably identified as "push". The system checks the validity of the receiving user identifier. If it is correct, the window responds by displaying a notification that the content has been pushed. In the case where the recipient is alerted that the content file has been pushed to them, when they access the file, the system transmits an alert message to the sending user.

From the recipient user's standpoint, the incoming pushed content is routed to a channel that is named "INBOX." This channel cannot be deleted or renamed because it is the repository for received content that is not part of any other channel set up by the recipient user. The file that was pushed now appears in the INBOX channel. On the recipient user's (e.g. viewer's) user interface, a notification is displayed to state that "<SENDING USER> has pushed you a file". Alternatively, an icon representing the transmitted file may be displayed with the name of the transmitting user. When the recipient selects the file, either by actuating the icon representing the file or otherwise entering a command to view the file, the file is displayed on the recipient's display device.

In yet another embodiment, if a content file that has been pushed permits forwarding, then the receiving user can select that received file to be pushed in the same manner as presented above. If the transmitting user deletes the original pushed file, then it will be removed from the recipients 'INBOX' and also other forwarding recipients that is has been pushed to.

The same feature can be used to push content to a mobile user. As an example if a company publishes some content onto a website or social network. A recipient user operating a mobile device can be guided to download the Pushfor mobile app as a result of clicking on a hyperlink on the webpage. By establishing a default or automatic login identity on the system, they will receive into their INBOX on their mobile device operating the Pushfor viewing app any content pushed to that identifier. This same process could also be triggered with a QR code printed on a poster or billboard.

Content Control: The transmitting user of content that uploads the content into the system can set controls on the content that they push. For example a document can be pushed to a recipient user and have certain restrictions placed on it. In one embodiment, the content files that have permission restrictions can be pushed to other users and retain the restriction settings, for example, restrictions on copying or re-transmission or printing. Other restrictions can include time-to-live or other kinds of expiration mechanisms. In yet another embodiment, where a user seeks to push a content file with a permission level or other domain of permitted distribution, the system can check that the specified destination user is a member of that domain and also has the correct permission level to access the document. If that logical condition is satisfied, the system pushes the content to that user. If not, it does not. For example, the user identifier may be associated in the system with an IP address range of an authorized computing device or network. In another example, the user identifier may be associated with an address whose email domain is known as an authorized domain.

The content file can retain restrictions that are associated with the file. There restrictions are checked by any device receiving the content using the system. Examples of restrictions include:

Restriction on how many views the file can have.
How long the file can be viewed for.
Causing the file to be deleted from an inbox when viewed once.
Limitations on when the file may be viewed.
GeoIP restricted viewing which prevents files being opened and viewed in restricted locations, either outside a company campus or in another country. This is accomplished by the system detecting either the location of the device by means of its location services or detecting the IP address of the device and mapping the IP address to an approximate location.

Operating Environment:

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages for example, javascript or php, that are executed by Internet web-browser, for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A system for distributing document files comprised of a computer server and at least one remote computing device associated with a corresponding at least one display program on the remote device, said system comprised of:
   a conversion subsystem comprised of logic operating on the server configured to receive a document data file of a file type that corresponds to a word processing program and comprised of alphanumeric data, from a transmitting user's device and convert on the server the document file into a predetermined image format file that is displayable by the display program;
   a first input module comprised of logic to receive at the server from the transmitting user's device associated with the received document file at least one content tag data to be associated with the document file and receive at the server from a device associated with at least one recipient user a corresponding at least one recipient selection data associated with the at least one recipient user corresponding to the at least one remote device;
   a second input module comprised of logic to receive at the server from at least one recipient user operating the corresponding at least one remote device an at least one channel tag data to be associated with the at least one recipient user;
   a database used by the server and configured by logic to persistently store data that associates the received document file with the image format file and the corresponding at least one content tag data, the at least one recipient selection data and to persistently store data that associates the received at least one channel tag data with the corresponding at least one recipient users;
   a routing module comprised of logic configured to automatically select at least one of the at least one recipient users by determining using logic whether the recipient selection data associated with the document file conforms with any of the channel tag data associated with at least one of the at least one recipient users; and in dependence on the determining step, automatically transmit from the server a data message to the at least one remote device corresponding to the selected at least one recipient user, the data message being comprised of data comprising the image format file or a link that when activated on the at least one remote device associated with the selected recipient user, causes a download of the image format file into the selected remote device.

2. The system of claim 1 where the recipient selection data is comprised of: a destination on a computer network for a transmitted message.

3. The system of claim 1 wherein the routing module is further configured by logic to select a subset of the selected recipient users where a restriction condition encoded in the at least one content tag data associated with the document file applies to the channel tag data associated with the recipient users comprising the selected subset and in dependence on such determination, prevent transmission of the document file to the remote devices associated with the selected subset of recipient users.

4. The system of claim 3 wherein the restriction condition is: the channel tag data associated with the selected subset of recipient users not including values indicating permission to access the document file.

5. The system of claim 3 where the restriction conditions is: restriction on how many views the image format file can have on a single receiving remote device.

6. The system of claim 3 where the restriction condition is: the remote device is in a restricted location.

7. The system of claim 3 where the restriction condition is the expiration of a predetermined amount of time from receiving the request to view the image format file.

8. The system of claim 3 wherein the restriction condition is that the IP address of the remote computer not being within some predetermined range associated with the document file.

9. The system of claim 3 wherein the restriction condition is that a domain associated with the selected subset of recipient users not being associated with a permissible domain associated with the document file.

10. The system of claim 3 wherein the restriction condition is that files cannot be opened or viewed in restricted geographic locations.

11. The system of claim 3 where the restriction conditions is how long the image format file can be viewed for on a single receiving remote device.

12. The system of claim 3 where the restriction conditions is causing the image format file to be deleted from the remote device upon being viewed once.

13. The system of claim 3 where the restriction conditions is limitations on time periods when the image format file may be viewed.

14. The system of claim 3 where the restriction conditions is a limitation on geographic locations of the remote device where viewing of the image format file is permissible.

15. The system of claim 1 further where the at least one content tag data associated with the image format file is comprised of data encoding use permissions and the system is further comprised of a security module comprised of logic configured to verify whether the selected at least one recipient user associated with the remote device is associated with a user permission that conforms to the use permissions comprising the at least one content tag data associated with the image format file and in dependence thereon, either causing or preventing transmission of the data message.

16. The system of claim 1 where the display program is comprised of logic and configured to receive the image format file from the transmitting module of the server and to prevent the selected at least one recipient user from accessing the image format file upon the display program detecting a restriction condition.

17. The system of claim 1 whereby activation of the hyperlink by the selected at least one recipient user using the associated remote device causes computer code to be downloaded to the remote device further causing such computer code to operate on the remote device, in order to retrieve and display the image file and prevent the image file from being stored or modified on the remote device.

18. The system of claim 1 where the routing module is further configured by logic to interact with a display program operating on the remote device in order to receive from the remote device an indicia of identity, and use the received indicia of identity in order to determine if a restriction condition applies to that remote device and to prevent transmission to that remote device upon detecting that the restriction condition applies.

19. The system of claim 1 where the received document file is comprised of data representing a text document.

20. The system of claim 1 where the image format file is transmitted by the server to the display program operating on the associated remote device with data encoding use restrictions in order to cause the display program to prevent use of the image format file in violation of the encoded restrictions.

21. The system of claim 20 where the data encoding use restrictions is comprised of one of: restriction on saving the image format file on the remote device, restriction on further transmitting the image format file, and restriction on viewing the image format file more than a predetermined number of times.

22. The system of claim 1 where the recipient selection data is comprised of an email address.

23. The system of claim 1 where the recipient selection data is comprised of an IP address.

24. The system of claim 1 where the recipient selection data is comprised of a reference to a data object listing identifiers associated with at least one recipient.

25. A method for distributing document files, executed by a computer system comprised of a computer server, a computing device associated with a transmitting user and at least one remote computing device associated with a corresponding at least one recipient user operating a display program on the remote device, said method comprised of:

Receiving at the server a document data file of a file type that corresponds to a word processing program and comprised of alphanumeric data at the server from a device associated with the transmitting user;

converting at the server the received document file into a predetermined image format file that is displayable by the display program;

receiving at the server from the device associated with the transmitting user at least one content tag data to be associated with the document file and a recipient user selection data representing at least one recipient user;

receiving at the server from the at least one remote devices associated with the corresponding at least one recipient users an at least one channel tag data to be associated with the corresponding at least one recipient users;

storing in a database data that associates the document file and the received corresponding at least one content tag data;

storing in the database at least one channel tag data corresponding to the at least one recipient users;

automatically selecting at the server at least one of the at least one recipient users by determining using logic whether the channel tag data associated with the at least one recipient user conforms with the recipient selection data, and automatically transmitting from the server a data message to the remote device associated with the selected at least one recipient user, the data message being comprised of data comprising the image format file or a hyperlink, that when activated, causes the image format file to be downloaded into the selected remote device.

26. The method of claim 25 further comprising:

Selecting at the server a subset of the selected at least one recipient users where a restriction condition encoded in the at least one content tag data associated with the document file applies to the channel tag data associated with the at least one recipient users in the subset and in dependence on such selection of the subset, prevent transmission of the document file to the remote devices associated with the selected subset of recipient users.

27. The method of claim 26 where the restriction condition is: the channel tag data associated with the selected subset of recipient users not including values indicating permission to access the document file.

28. The method of claim 26 where the restriction condition is one of: the expiration of a predetermined amount of time from receiving the request to view the image format file and the remote device being in a restricted location.

29. The method of claim 26 where the restriction condition is that the IP address of the remote computer not being within some predetermined range associated with the document file.

30. The method of claim 26 where the restriction condition is that a domain associated with the selected subset of recipient users not being associated with a permissible domain associated with the document file.

31. The method of claim 26 where the restriction condition is how long the image format file can be viewed for on a single receiving remote device.

32. The method of claim 26 where the restriction condition is causing the image format file to be deleted from the remote device upon being viewed once.

33. The method of claim 26 where the restriction condition is limitations on time periods when the image format file may be viewed.

34. The method of claim 26 where the restriction condition is limitations on geographic locations of the remote device where viewing of the image format file is permissible.

35. The method of claim 25 where the at least one content tag data associated with the image format file is comprised of data encoding use permissions and the method is further comprised of verifying whether the at least one recipient user associated with the remote device is associated with a user permission value that conforms to the use permissions comprising the at least one first tag data associated with the image format file and in dependence thereon, either causing or preventing transmission of the data message.

36. The method of claim 25 where the method is further comprised of:

the display program receiving the image format file from the transmitting module on the server and preventing the at least one selected recipient user from accessing the image format file upon the display program detecting a restriction condition.

37. The method of claim 25 whereby activation of the hyperlink by the selected at least one recipient user using the associated remote device causes computer code to be downloaded to the remote device causing such computer code to operate on the remote device, and in operation retrieve and display the image format file and prevent the image format file from being stored or modified on the remote device.

38. The method of claim 25 where the step of transmitting the image format file to the display program operating on the associated remote device is further comprised of transmitting data encoding use restrictions in order to cause the display program operating on the associated remote device to prevent use of the image format file in violation of the encoded restrictions.

39. The method of claim 38 where the data encoding use restrictions is comprised of one of: restriction on saving the image format file on the remote device, restriction on further transmitting the image format file, and restriction on viewing the image format file more than a predetermined number of times.

40. The method of claim 25 further comprising:

interacting by the server with the display program operating on the remote device, a protocol in order that the server receive an indicia of identity; and determining by logic using the received indicia of identity if the restriction condition applies to that remote device.

41. The method of claim 26 where the restriction conditions is: restriction on how many views the document file can have on a single receiving remote device.

42. The method of claim 25 where the received document file is comprised of data representing a text document.

43. The method of claim 25 where the recipient selection data: is comprised of a destination on a computer network for a transmitted message, an email address.

44. The method of claim 25 where the recipient selection data is comprised of an email address.

45. The method of claim 25 where the recipient selection data is comprised of an IP address.

46. The method of claim 25 where the recipient selection data is comprised of a reference to a data object listing identifiers associated with at least one recipient.

* * * * *